US006532450B1

(12) United States Patent
Brown et al.

(10) Patent No.: US 6,532,450 B1
(45) Date of Patent: Mar. 11, 2003

(54) FINANCIAL MANAGEMENT SYSTEM INCLUDING AN OFFSET PAYMENT PROCESS

(75) Inventors: Zipora Brown, Fairfax, VA (US); Michael Vernon Baker, Herndon, VA (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/207,681

(22) Filed: Dec. 9, 1998

(51) Int. Cl.$^7$ ............................................... G06F 17/00
(52) U.S. Cl. ....................................................... 705/40
(58) Field of Search ............................... 705/30, 40, 38

(56) References Cited

U.S. PATENT DOCUMENTS

| | | | | | |
|---|---|---|---|---|---|
| 5,390,113 A | * | 2/1995 | Sampson | | |
| 5,875,435 A | * | 2/1999 | Brown | ........................ | 705/30 |
| 5,966,698 A | * | 10/1999 | Pollin | .......................... | 705/34 |
| 5,991,733 A | * | 11/1999 | Aleia et al. | ..................... | 705/8 |
| 6,023,694 A | * | 2/2000 | Kouchi et al. | ................... | 707/2 |
| 6,041,312 A | * | 3/2000 | Bickerton et al. | ............ | 705/30 |
| 6,073,104 A | * | 6/2000 | Field | .............................. | 705/1 |

FOREIGN PATENT DOCUMENTS

| | | | | |
|---|---|---|---|---|
| JP | 2002007754 A | * | 1/2002 | |
| WO | WO94/23528 | * | 10/1994 | .......... H04M/15/00 |

OTHER PUBLICATIONS

Riverbark, Leigh, "Paychecks could be cut to repay delinquent loans", Federal Times, vol. 32 Issue 51, p3, 1/3p, Jan. 1997.*
Cordell, Larry, "Scoring Tools to Battle Delinquencies", Mortgage Banking, vol. 58, p49, 5p., Feb. 1998.*
"TSYS Forms Strategic Alliance with Rothernberg Systems International: Offers One–of–a–kind, Window–Based Integrated Recovery System to Clients", Dialog File 16, Access No. 04585201/9, Sep. 1996.*
"http://www.rsi–world.com/news/narex.htm", About RSI page. News release, Jul. 1998.*

(List continued on next page.)

Primary Examiner—James P. Trammell
Assistant Examiner—Pierre E. Elisca
(74) Attorney, Agent, or Firm—Staas & Halsey LLP

(57) ABSTRACT

The present invention is a system that includes a first financial management system handling receivables and a second financial management system handling payables. The receivables system sends debt offset information to an offset payment system and the payables system sends payment information to the offset payments system. The offset payment system either makes a payment or offsets the payment with the debt. The financial management systems receive offset information from the offset payment system. The system designates debt and payments that are suitable for offset using threshold criteria. The system allows administrative fees and other charges, such as interrest and penalties, to be added to the debt. During the referral of the debt to the offset payments system, the debtor as well as other parties, such as credit bureaus, are informed or notified of the delinquent debt. When an offset occurs the system feeds the amount of the offset back to the receivables and payables systems to update the records therein to reflect the amount and that the amount was an offset. That is, an authorized payment is shown as fully or partially offset and a debt is shown as fully or partially satisfy via the offset. The records of financial management systems are updated when a payment is made by the debtor after a referral has occurred, when a decision is made to write-off the debt. The invention also provides for reconciliation. Online access to the records is also provided.

2 Claims, 18 Drawing Sheets

OTHER PUBLICATIONS

Olsen, Florence,"Agencies are due $50 billion but systems can't collect", Government Computer News, v16, n36, p8, Dec. 1997.*

Foltin et al., "Beyond Expert Systems:, Neural networks in accounting", National Public Accountant, v41n6, pp:26–30, Jun. 1996*

News Release, "TSYS forms strategic alliance wit Rothenberg System International: Offers One–of–a–Kind, Windows–Based Recovery System to Clients", Dialog File 16, Access No. 0458201, Sep. 1996.*

Dynacomp, Inc. (095443).*

Debt Management Services Financial Management Services, U.S. Department of the Treasury, *Treasury Offset Program*, Agency Implementation Guide, May, 1997, pps. 1–1 to 8–2 and A–1 to N–2.

American Management Systems, Inc., *Automated Disbursements*, Momentum Financials User's Guide, Version 3.0, Nov. 1997, pps. 1–6.

American Management Systems, Inc., *Accounts Payable*, Momentum Financials User's Guide, Version 3.0, Aug., 1997, pps. 1–4.

American Management Systems, Inc., *Accounts Receivable*, Momentum Financials User's Guide, Version 3.0, Aug. 1997, pps. 1–6.

* cited by examiner

FINANCIAL MANAGEMENT SYSTEM INCLUDING AN OFFSET PAYMENT PROCESS

BACKGROUND OF THE INVENTION

1. Field of the Invention

The present invention is directed to a financial management system that provides full business support for the offset of payments to parties against delinquent debts when the payments, debts and receivables are tracked by different groups or entities.

2. Description of the Related Art

As part of their business processing, many organizations perform accounts payable and accounts receivable functions. In larger organizations (such as the federal government and multinational corporations) these functions are typically supported by the use of a financial management system (such as the American Management System—AMS—Momentum™ system). Many large organizations (like the federal government or the multinational corporations) have distinct operational entities (e.g., federal agencies in the federal government or independent entities with the corporation) that each perform financial management functions such as accounts payable and accounts receivable. Each of these operational entities run the financial management system in support of their operations.

One of the key business functions in accounts receivable is the management of delinquent debt (i.e., overdue, uncollected receivables). One mechanism for managing delinquent debt is to offset any payments to the debtor by the amount of the delinquent debt. Traditionally, for organizations with distinct operational entities, there were no mechanisms in place that could link one entity's delinquent debts with another entity's payments. For example, federal agency ABC may have delinquent debt with a vendor while federal agency XYZ is making payments to the same vendor.

Recently, there have emerged third-party mechanisms (such as the Treasury Offset Program (TOP) supported by Treasury FMS in the federal government) that provide for the centralized collection of delinquent debt for the purpose of offsetting payments to debtors. Systems such as TOP handle the issuance of offset payments through the matching of payments against delinquent debts. TOP specifications are defined in the Treasury Offset Program Agency Implementation Guide of May 1997, published by Debt Management Services of the Financial Management Service of the U.S. Department of Treasury incorporated by reference herein.

The traditional financial management systems do not provide for the support of such offset programs. What is needed is a system that fully supports the offset of payments in a situation where different organizational entities handle different aspects of the offset process.

SUMMARY OF THE INVENTION

It is an object of the present invention to provide a system that captures offset payment information and keeps the financial management system records (e.g., general ledger, budget, etc.) managed by different entities updated for the offset transactions.

It is another object of the present invention to provide flexible identification and selection of debts as well as payments suitable for offset.

It is an additional object of the present invention to provide automatic calculation and assignment of charges associated with the offset referral process.

It is another object of the present invention to provide for the transmission of delinquent debt information in multiple formats, including extensible mark-up language (XML).

It is still another object of the present invention to provide automatic notification of debtors in multiple media (e.g., letter, e-mail, phone message) when debt is referred for offset and when a payment is offset.

It is another object of the present invention to allow for the electronic receipt of offset payment information in multiple media formats.

It is also an object of the present invention to provide automatic referral to credit bureaus when debt is referred for offset.

It is an object of the present invention to provide an ability to track bankruptcy information and relate it to debts referred for offset.

It is a further object of the present invention to provide direct online access to the offset payment system from within the financial management system.

It is another object of the present invention to provide reconciliation between the separate financial management systems for payables and receivables and the offset payment system.

It is also an object of the present invention to allow external indirect online access via Web and telephonic queries to debt and payment information related to offset payments to, for example, allow determination of debt and payment status.

It is another object of the present invention to provide an ability to flag financial transactions and extract data when referral thresholds are met.

It is still another object of the present invention to provide an ability to extract offset information in support of debtor data warehousing and work flow operations.

The above objects can be attained by a system that includes a financial management system handling receivables and a financial management system handling payables which both send offset information to and receive offset information from an offset payment system. The system designates, in the respective separate receivables and payables systems, debt and payments that are suitable for offset using threshold criteria such as age, amount, party, etc. The system allows administrative fees and other charges to be added to the debt at the time of the referral. During the referral of the debt to the offset payment system, the debtor as well as other parties, such as credit bureaus, are informed or notified of the delinquent debt. When an offset occurs the system feeds the amount of the offset back to the receivables and payables systems to update the records therein to reflect the amount offset and that the amount was an offset. The system also updates the records of the systems when a payment is made by the debtor after a referral has occurred, when a decision is made to write-off the debt as well as when the debtor is involved in bankruptcy.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention provides full business function support within a financial management system for the third-party offset of payments against delinquent debts. This includes ensuring the financial management system general ledger, budget, project, and related components are updated to account for the offset activities. In addition, the invention provides flexibility in the identification, selection, transmission, and tracking of debt and payments subject to offset. The invention also provides mechanisms for external query access and automatic notification of debtors/payees and credit bureaus when debt is referred for offset or an offset payment is recorded. The invention further provides for the electronic receipt, tracking, reconciliation, and analysis of offset payment information. The invention modifies, adds to or improves a conventional financial management system, such as the AMS Momentum™ system, to support third party offset of payments.

Figure 1:
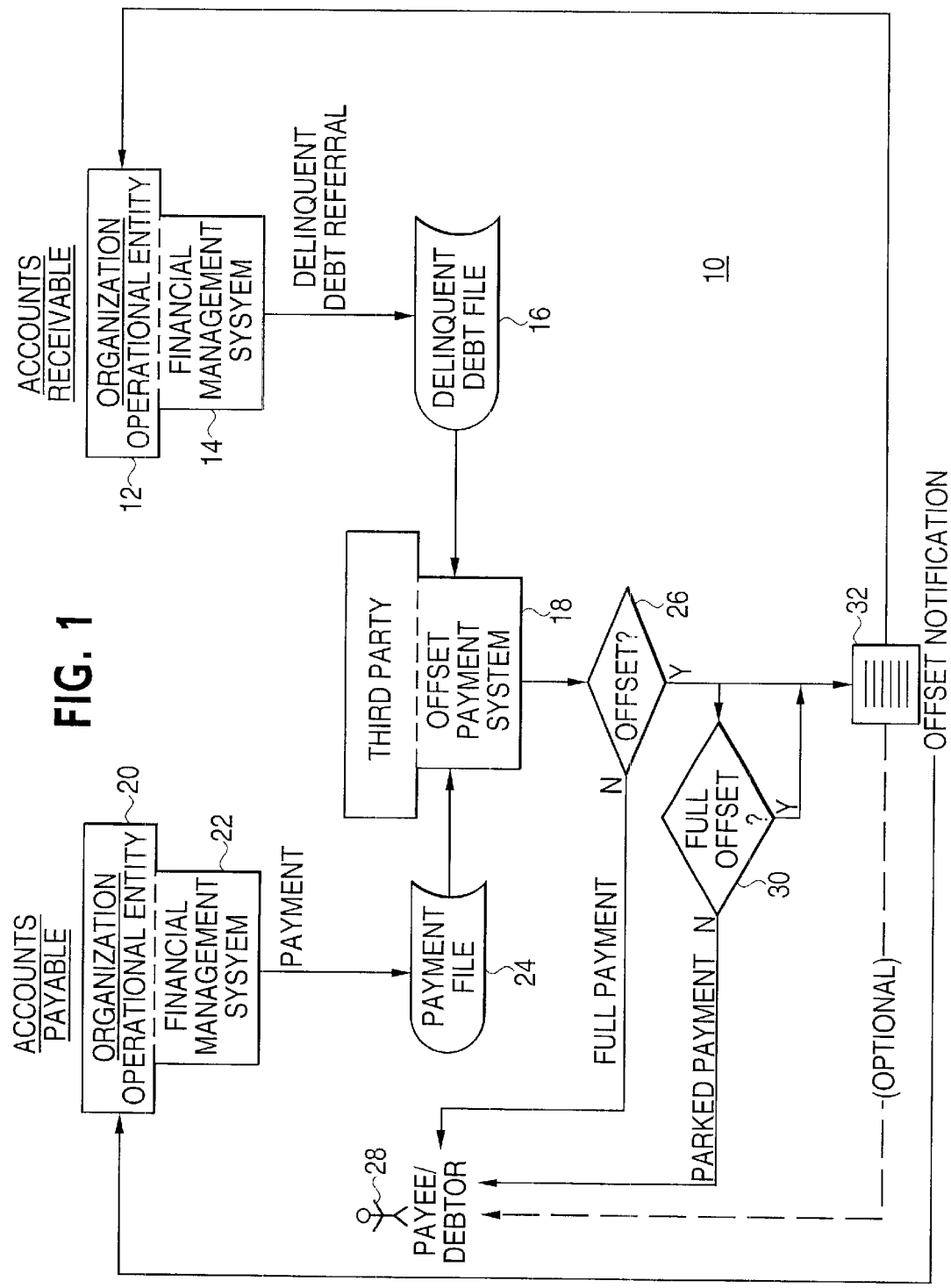
FIG. 1 illustrates the offset system of which the present ion is a part.

FIG. 1 depicts an overall offset process 10 within which the present invention operates. As part of the accounts receivable processing, an organization's operational entity 12 (such as a first federal agency or a first division of a company) using a financial management system 14, such as that previously mentioned, refers delinquent debt, in the form of a delinquent debt file 16, to a third-party offset payment system 18. Similarly, as part of the accounts payable processing, an organization's operational entity 20 (such as a second federal agency or a second division of a company) using a financial management system 22, such as that previously mentioned, sends payments, in the form of a payments file 24, to the third-party system 18 which can be another federal agency or a third division within a company. The offset payment system 18 matches payments against delinquent debts. If no match occurs 26, a full payment is made to the payee 28. If a match occurs, the payment is offset up to the full amount. If the delinquent debt amount is less than the payment amount and a partial offset is needed 30, a partial payment is issued to the payee 28. If the delinquent debt amount is greater than or equal to the payment amount, no payment is issued to the payee. The offset payment system may notify the payee/debtor and does notify 32 the operational entities 12 and 20 of the offset.

The focus of offset systems like TOP is to perform the match of payments against delinquent debt and offset the payment as applicable. As such, the conventional systems do not deal with the various functions related to the operational entity's detailed accounts payable, accounts receivable, and customer service business areas. The business functions that exist as a result of having a third-party offsetting mechanism need to be supported within the operational entities. For example, within accounts receivable, the introduction of an offset payment system impacts areas such as the referral of debt, tracking and management of debt information, write-off's, collections, and debtor queries. Within accounts payable, the offset payment system impacts areas such as the generation of payments, tracking offsets, and payee queries.

The present invention deals with providing full business function support within the financial management system for the third-party offset of payments against delinquent debts. Specifically, within the accounts receivable business area, this invention provides support in the financial management system for the following functions:

Flexible selection of receivables for offset referral.

Calculation and accounting of charges associated with the offset referral.

Generation and electronic transmission of a debt file to the offset system.

Automatic notification of the debtor when the debt is referred for offset.

Automatic referral of debt information to credit bureaus when the debt is referred for offset.

Processing of write-off of debt referred for offset.

Payment of debt referred for offset.

Tracking of bankruptcy information for debts referred for offset.

Accounts receivable updates for offsets payments.

Within the accounts payable business area, this invention provides support in the financial management system for the following functions:

Flexible determination of whether a payment is subject to offset.

Accounts payable updates for offset payment.

In addition, this invention provides support in the financial management system for the following functions that span accounts payable and accounts receivable business areas:

Receipt of offset payment information in multiple media.

Direct online access to the offset system.

Querying, tracking, and analysis of offsets.

Figure 2:
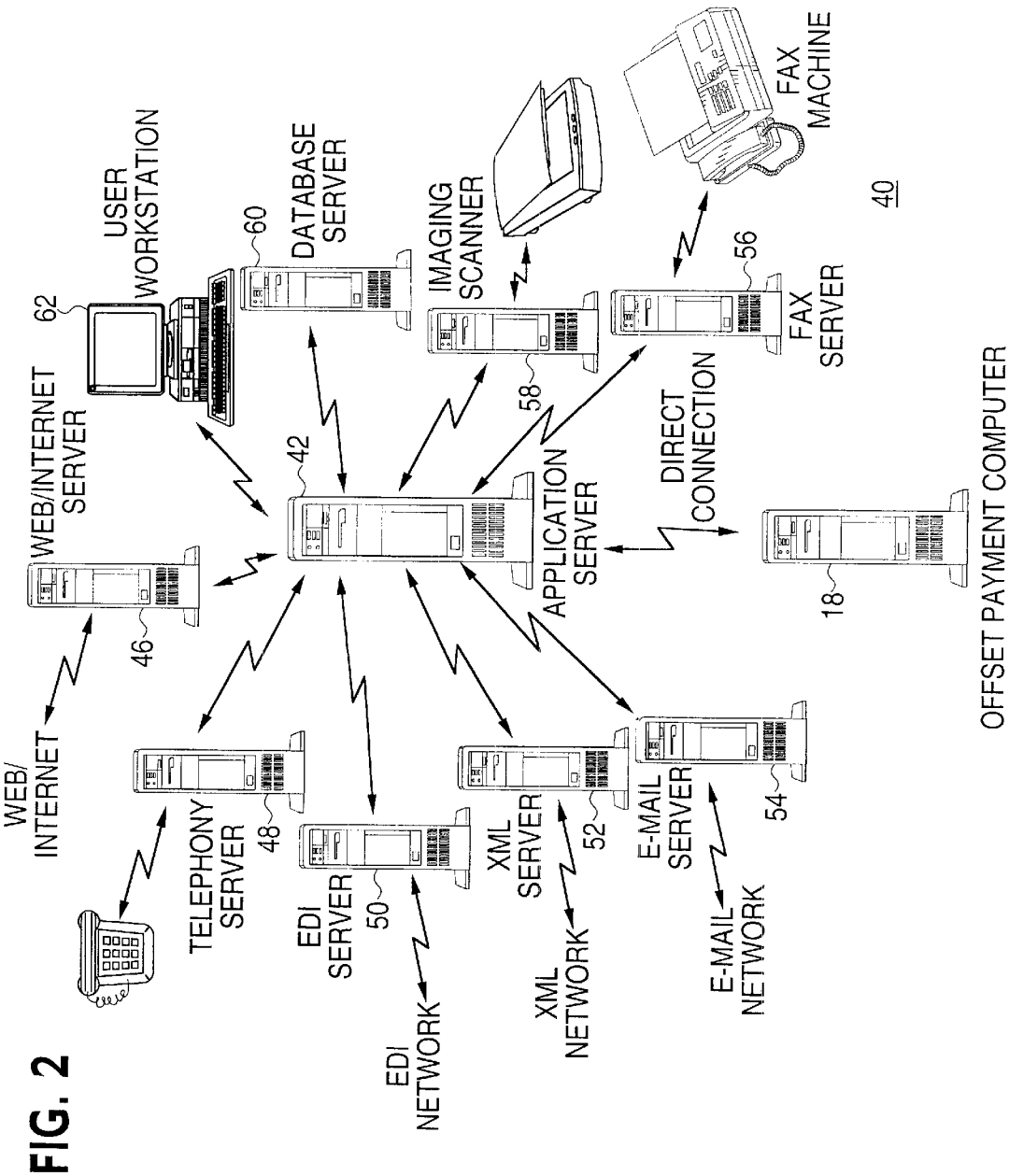
FIG. 2 depicts the hardware used in the present invention.

The present invention is implemented using a hardware configuration 40 preferably as depicted in FIG. 2 and which is used for each entity in the system. The system 40 is coupled to the offset payment system computer 18 and includes an application server 42 performing typical operations such as executing the conventional Financial Management system, performing process communication, etc. and performing the operations associated with the present invention. The class of the server 42 machine depends on system size and can be from a desk top machine to a mainframe machine. Additional servers of, for example, a desk top class, can be provided for Internet communications 46, telephony communications 48, electronic data interchange (EDI) 50, extensible mark-up language (XML), e-mail 54, facsimile 56, imaging 58, database processor 60 and user workstation operation 62 and other subsidiary functions described herein. The system 40 is a distributed system and of course the functions could be handled by a single mainframe computer or other configuration as desired.

The present invention communicates with a payments offset process running in the system 18 and which essentially matches payments to be made with debts owed and offsets any debts with such payments. Such systems 18 exist in the form of the US government system previously discussed. The implementation of such a system by those of ordinary skill in the art for a non-governmental entity such as an offset contractor working for a number of different companies or an offset organization within a single company having different processing centers for payables and receivables can be accomplished using a system such as the Federal TOP system. As a result and for the purposes of simplicity, the operation of such a system will not be described in detail herein. Additionally, existing financial management systems, such as the preferred Momentum™ system from AMS, perform conventional operations such as making the general ledger and other accounting entries for transactions such as the entry of a payment on a debt. Again for purposes of simplicity such operations will not be described herein in detail since they are within the skill in the art. The discussion herein will instead focus on the receivable and payable operations that are performed, that allow full business function support within the financial management system for the third-party offset of payments against delinquent debts.

Figure 3:
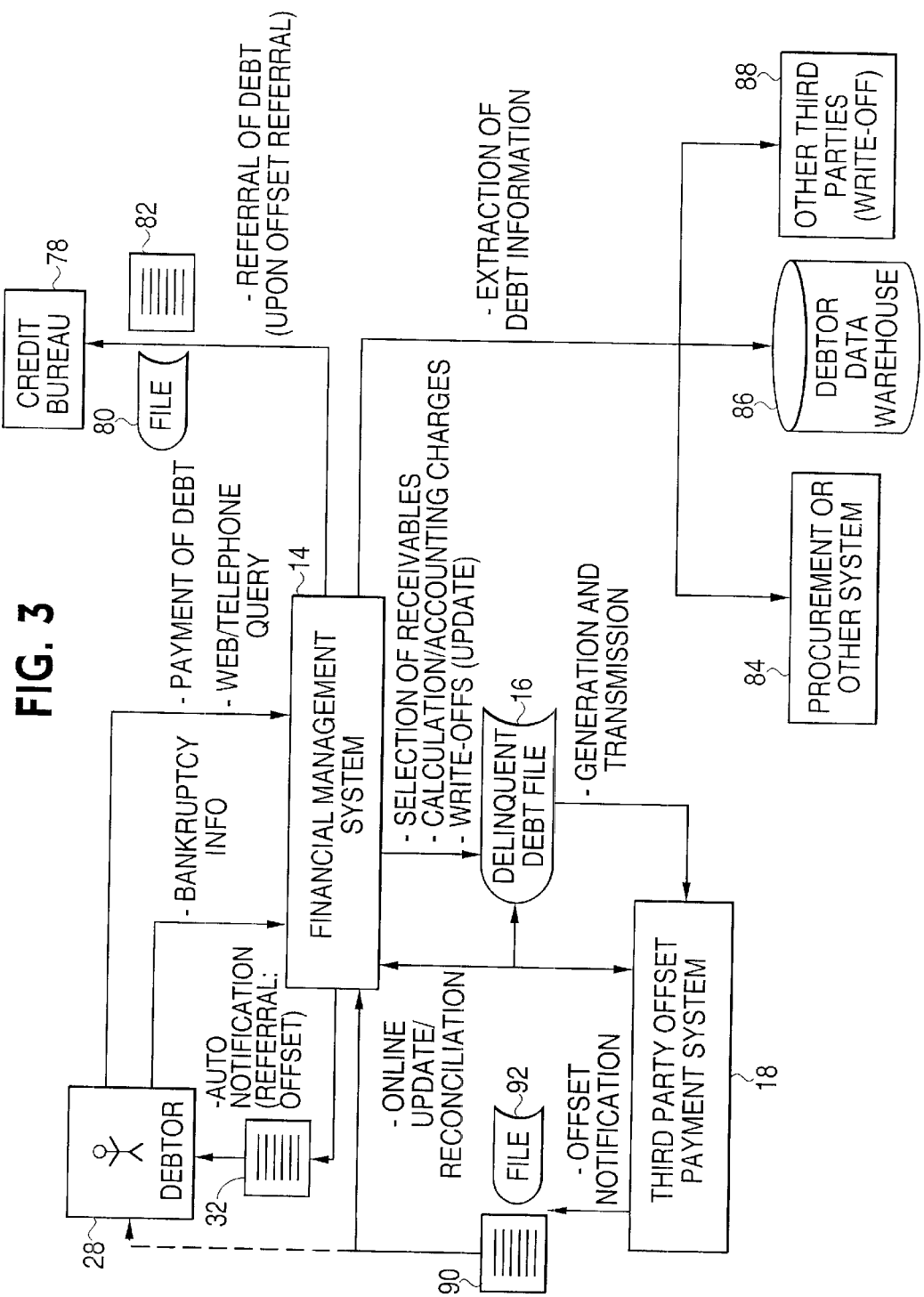
FIG. 3 shows the accounts receivable processes.
Figure 4:
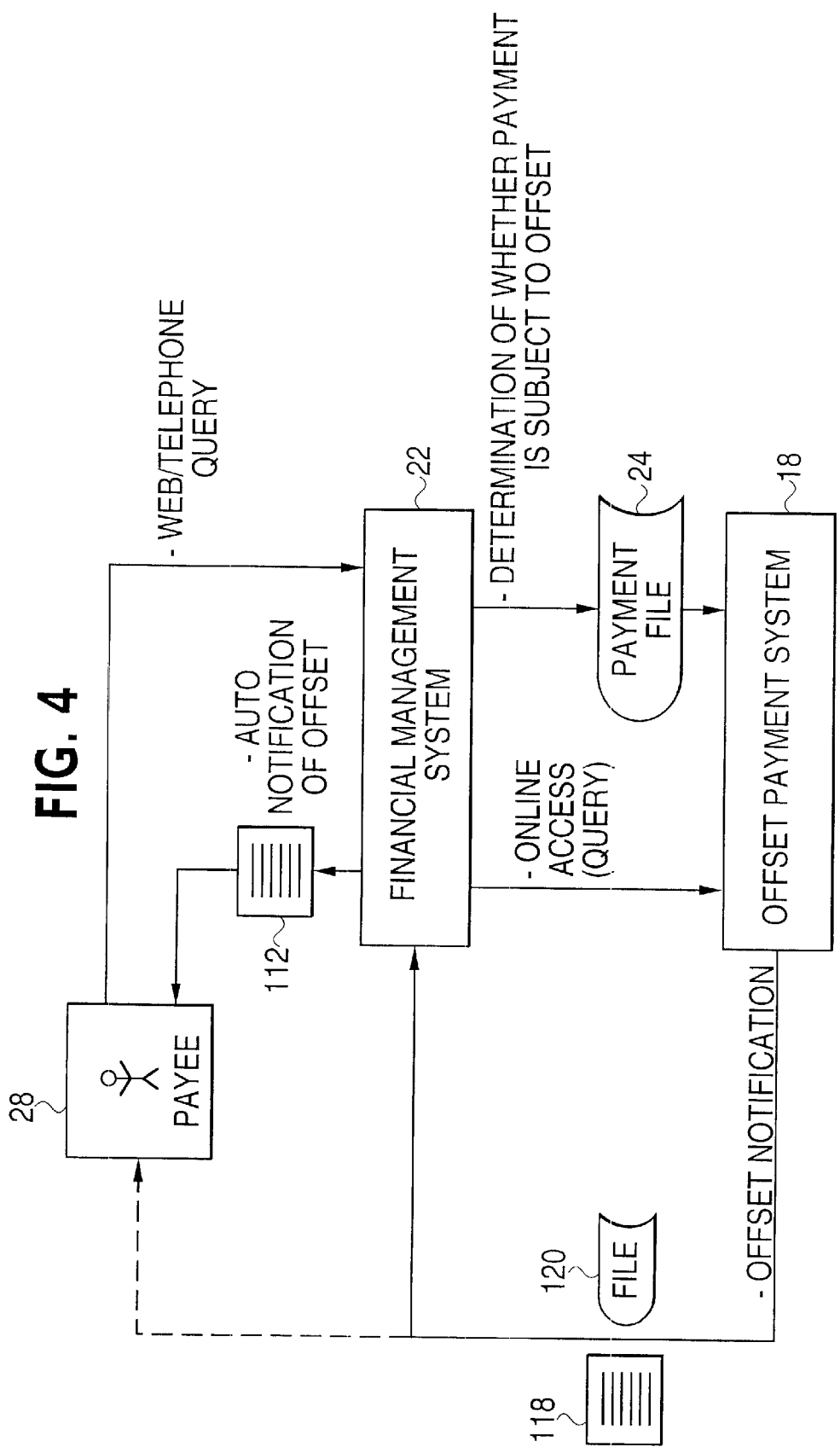
FIG. 4 shows the accounts payable processes.
Figure 17:
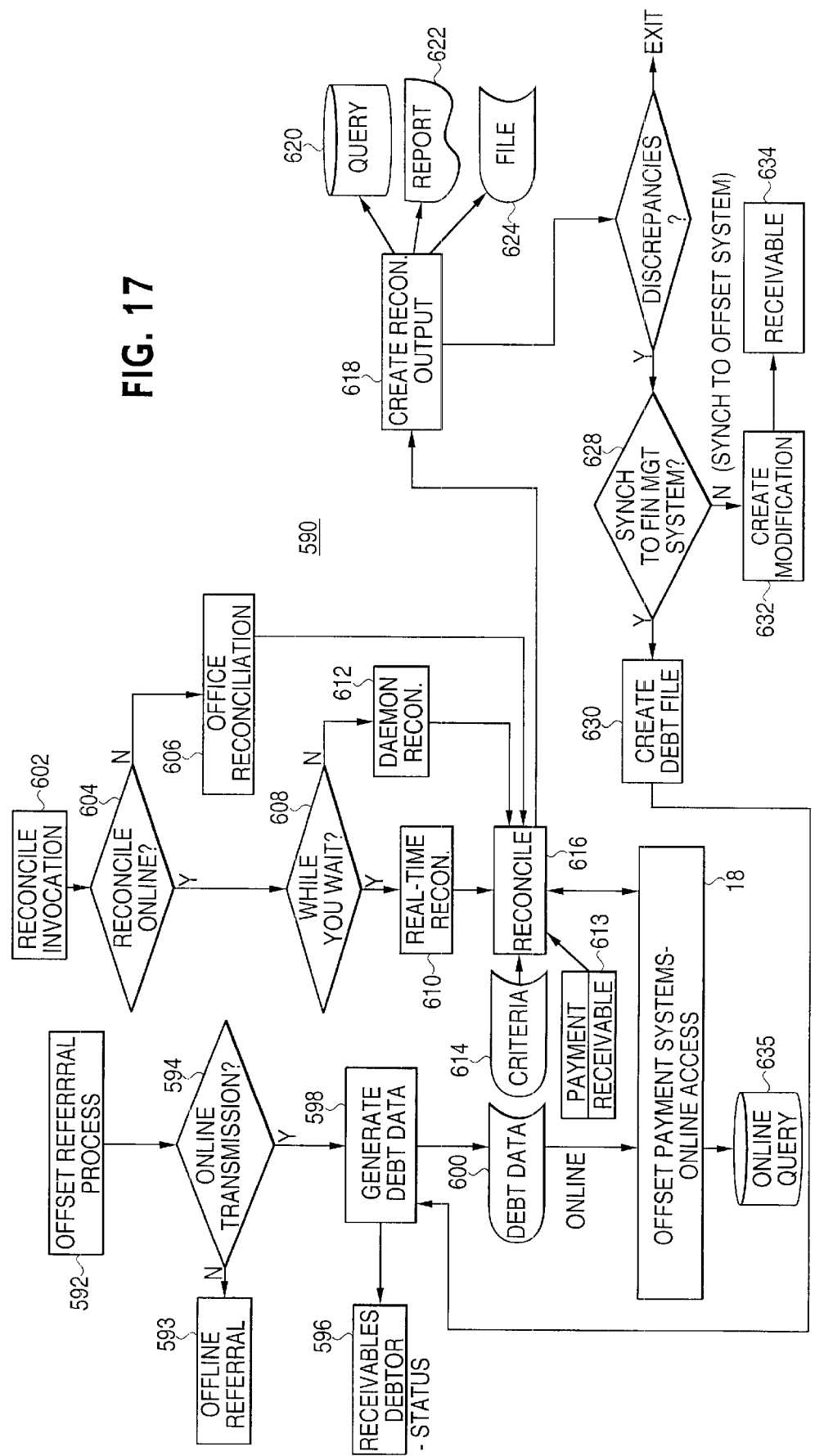
FIG. 17 illustrates online access operations associated with the offsets.
Figure 18:
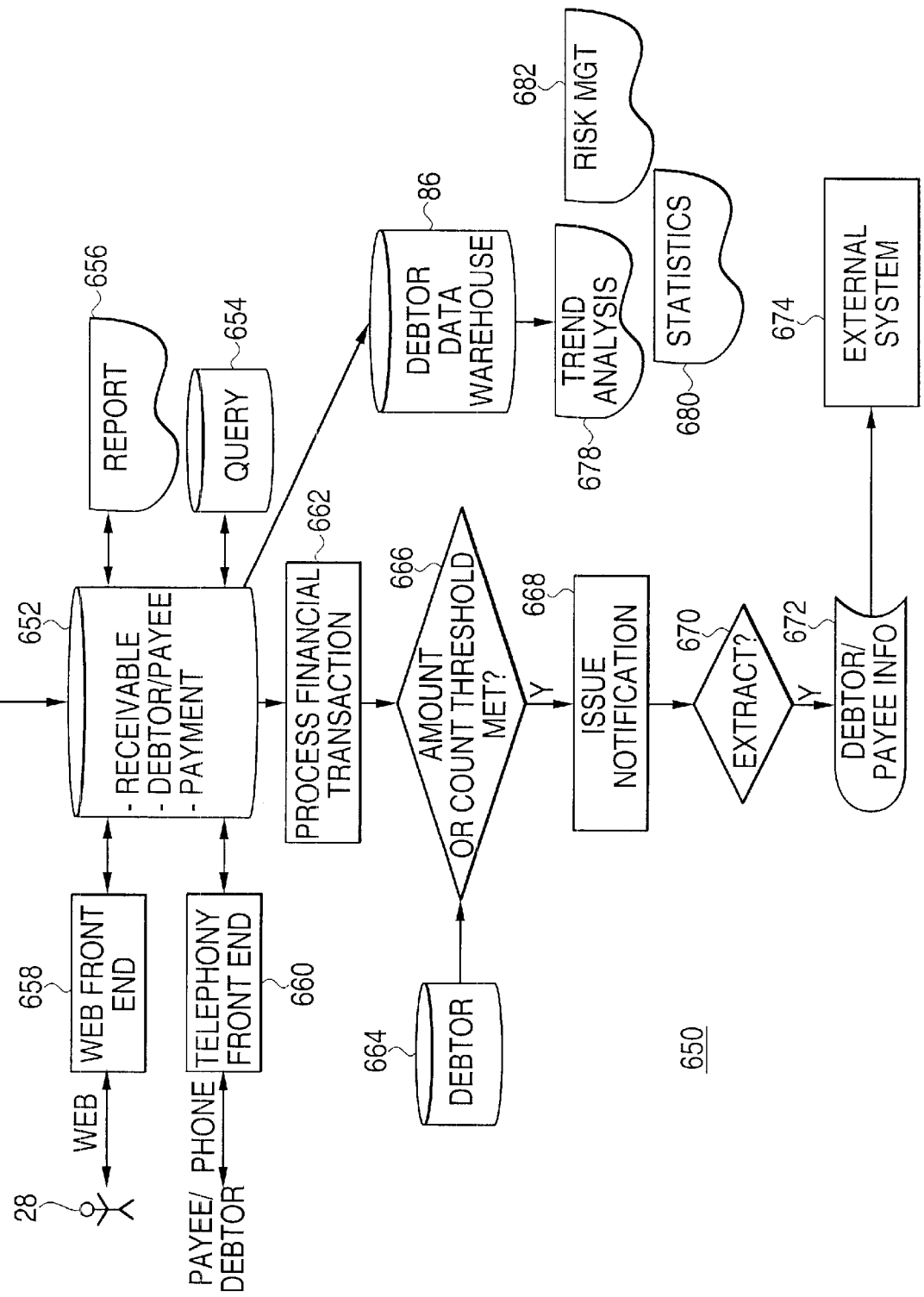
FIG. 18 depicts queries to the system for information of the offset.

FIG. 3 is a flowchart of the overall accounts receivable processes supported by the invention while FIG. 4 is a flowchart of the overall accounts payable processes supported by the invention. FIGS. 5–13 will be used to describe the receivables process in more detail, FIGS. 14 and 15 will be used to describe the payables process in more detail and FIGS. 16–18 will be used to described other functions performed by the invention.

The financial management system 14 (see FIG. 3) for the receivables side of the offset process determines which accounts need to be selected for inclusion in the debt file 16, determines any accounting charges and determines any updates to the debt file based on payments that the debtor makes as well as any writeoffs of the debt and the file 16 is provided to the offset payment system 18. The system 14 can also automatically send a notification 32 to the debtor 28. At the same time the system 14 optionally notifies a credit bureau 78 of the delinquent debt referral using a referral data file 80 and if desired a notification letter 82. At this time the financial management system 14 can provide data concerning the debtor to other destinations. For example, a procurement system or a vendor database 84 can be notified that the debtor has been found delinquent allowing the procurement system 84 to select the debtor for purchases that can be later offset. An enterprise wide data warehouse 86 can store the data for use in statistical analysis of debt transactions. Third parties 88, such as the U.S. Internal Revenue Service, can be informed about the writeoff. The reporting capability also allows a warning to be provided to other third parties that can allow them to avoid establishing business relationships with the debtor. The offset system 18 can notify the debtor 28 by letter 90 as well as provide an offset notification file 92 back to the financial management system 14 allowing the system 14 to show the debt, or a portion thereof, as having been satisfied via an offset. The notification can also indicate whether the debtor has been notified by the system 18 allowing system 14 to avoid duplication. The notification can also indicate what entities were involved with the offset. The debtor can make an inquiry of the system to determine the size of the debt or remaining debt if offset. When the debtor 28 makes a payment, the financial management system 14 performs the processes to update the various files. The system 14 can also allow the debt to be written off based on internal debt writeoff criteria as well as set the debt as satisfied when bankruptcy information about the debtor is received. Again the system updates the various files. These operations will be discussed in more detail later herein.

As shown in FIG. 4, the financial management system 22 for the payables side of the offset process provides a payment authorization, based on an invoice, as well as provides an indication that the payment can be offset to the offset system 18 in the form of a payment file 24. The system 18 performs the offset and notifies the payee 28 via a letter 118 and notifies the system 22 via an offset file 120. The system 22 handling the payables updates the payee data for the payment as paid via an offset and sends a notification letter 112 to the payee indicating full or partial offset of the payment the payee was to receive. The file notification can also indicate whether the payee has been notified by the system 18 to allow system 22 to avoid duplication. The notification can also indicate what entities were involved with the offset.

Figure 5:
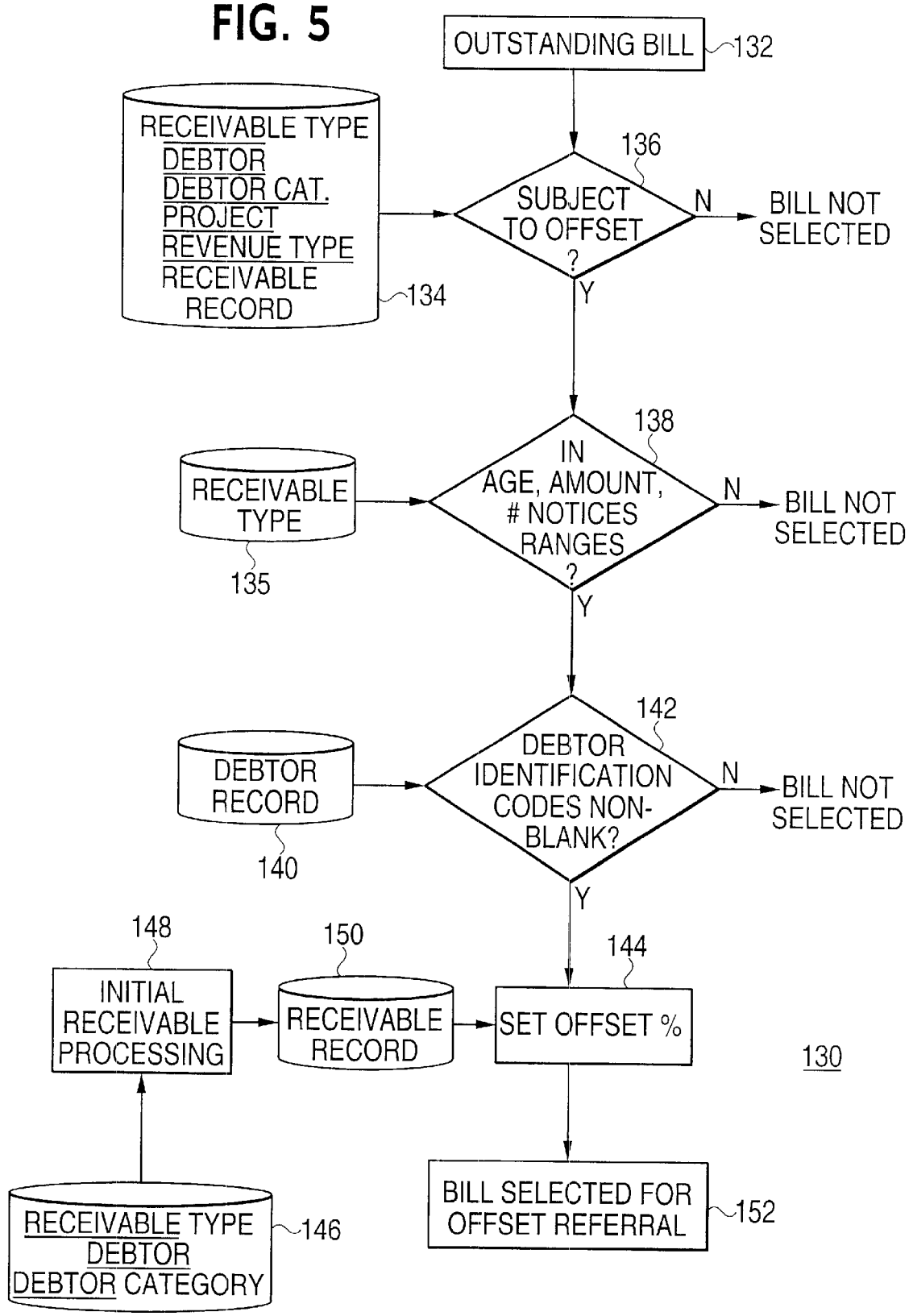
FIG. 5 illustrates the process of determining whether and how much of a debt is subject to offset.

As part of the receivables processing the system 14 needs to select which debts to send to the offset system 18 for offset when possible. This selection process 130 is depicted in FIG. 5 and includes the ability to select and mark delinquent, uncollected receivables for referral to an outside collection agency based on offset-related selection criteria. When an outstanding bill 132 is encountered during financial system processing, the system accesses the receivables system database for the receivables information 134 and determines 136 whether the bill is suitable for offset. Various criteria may be used to determine if a specific receivable is subject to offset. For example, it may vary based upon the specific type of the receivable, the specific debtor, the debtor category, the project associated with the receivable, the type of revenue (such as fees or taxes) associated with the receivable, or the specific receivable record. To provide flexibility in meeting this criteria, in the invention, an offset indicator is used as a part of the financial management system records which defines the different types of receivables, the debtors, the debtor categories, the projects, the types of revenue, and the receivable records. A receivable will be selected for offset only if all of the indicators indicate that it is subject to offset.

Next, the receivables type information 135 is accessed to determine 138 whether the debt satisfies age, amount, notice, etc., criteria. Before referring a debt for offset, it typically must meet minimum and maximum age criteria. The criteria may vary depending upon the type of receivable. For example, debts referred to TOP must be at least 180 days delinquent and not more than 10 years delinquent, with exceptions for certain types of receivables (e.g., student loan debt may be more than 10 years delinquent). To provide flexibility in meeting this criteria, minimum and maximum age fields are included in the financial management system records that define the different types of receivables. A receivable will be selected for offset only if it is within the minimum and maximum age limits based upon the type of debt (as indicated by the age criteria on the receivable type record). The debt may also need to meet minimum and maximum amount criteria. The criteria may vary depending upon the type of receivable. For example, debts referred to TOP must be at least $25. To provide flexibility in meeting this criteria, minimum and maximum amounts fields are included in the financial management system records that define the different types of receivables. A receivable will be selected for offset only if it is within the minimum and maximum age limits based upon the type of debt (as indicated by the amount criteria on the receivable type record). Before referring a debt for offset, there may need to be a minimum number of late notices sent out to the debtor regarding the debt. The criteria may vary depending upon the type of receivable. To provide flexibility in meeting this criteria, a minimum number of late notices field is included in the financial management system records that define the different types of receivables. A receivable will be selected for offset only if the number of notices sent to the debtor meet the minimum number of notices criteria based upon the type of debt.

Then, the system accesses the debtor record 140 and determines 142 whether the debtor has been properly identified. Offset systems need to use unique debtor identifier codes or information and can also use a debtor name to perform the match of payments against delinquent debts. Of course, the debtor name can be part of the unique debtor identification information. For example, TOP uses the taxpayer identification number (TIN) of the debtor in conjunction with the debtor name. Receivables that do not contain the unique identifier codes may not be appropriate for offset. According to the present invention, an offset debtor code indicator is included in the financial management system records to define what debtor codes (e.g., TIN, DUNS number, name, etc.) are required for the offset referral. A receivable will be selected for offset only if the associated debtor codes (e.g., TIN and name) are non-blank.

The system then sets 144 an amount of the bill that can be subject to the offset as a percentage by examining the type of the receivable 146 received and the initial processing 148 of the receivable 146 used to create the receivable record 150. Once the offset percentage is determined, the bill selected for referral is passed 152 to the next stage of processing. Various criteria may be used to determine the percentage of offset that should be applied to the debt. For example, certain types of loans may be subject to offset up to 50%. It may vary based upon the specific type of the receivable, the specific debtor, the debtor category, the project associated with the receivable, or the type of revenue (such as fees or taxes) associated with the receivable. To provide flexibility in meeting this criteria, an offset percent field is included in the financial management system records that define the different types of receivables, the debtors, the debtor categories, the projects, and the types of revenue. When a receivable 146 is initially recorded in the system, the percentage is determined 148 based upon the percent associated with the type of receivable, debtor category, debtor, project, or type of revenue. If any of these percentages are different, the receivable processing will enable the user to select the desired percentage. The percentage associated with the receivables record will be used as the offset percentage if the receivable is selected for offset.

Figure 6:
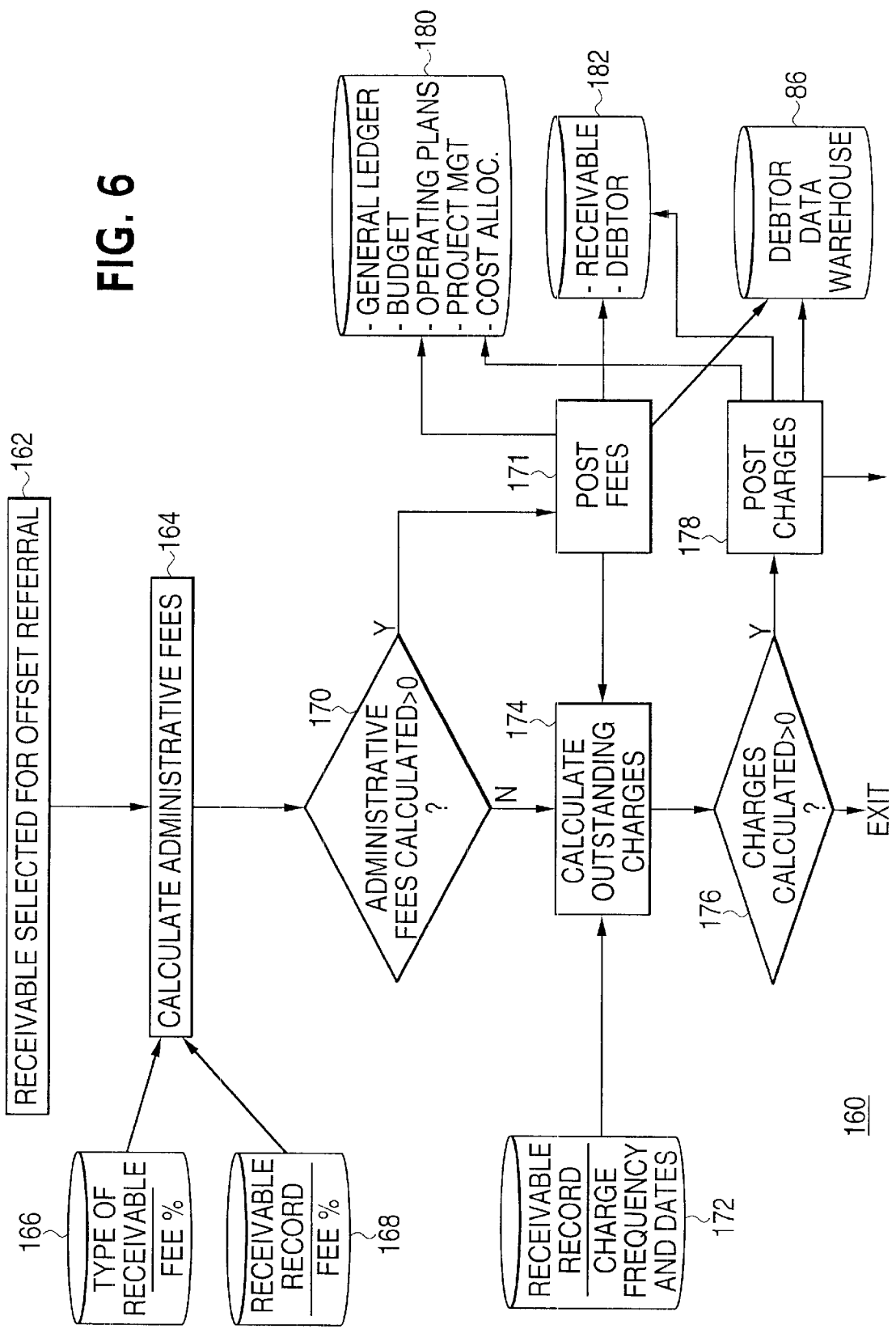
FIG. 6 depicts the addition of charges to a referred debt.

Once the debt is selected for offset, the present invention allows administrative charges, interest, penalties, etc. to be added to the debt before it is referred to the offset system 18 as depicted by the process 160 in FIG. 6. In addition, interest, penalties and other charges may be assigned to debt which has already been referred for offset by sending an updated debt file to the offset payment system 18. Those receivables 162 selected for offset first have any administrative fees associated therewith calculated 164 based on the fee percent values for the type of receivable 166 and the receivable record 168. For example, a fee may be charged by the third party for each debt record being referred. To support this need, the financial management system performs calculation of administrative fees based on general criteria (such as a percent based upon the type of receivable) and specific criteria (such as the fee to be assigned to the specific receivable record). If these fees are greater than zero (170) the fees are added to the debt as part of the referral and posted 171 in the financial management system as expenses. These expenses are then conventionally accounted for in the financial management system's general ledger, budget, operating plans, project management, and cost accounting records 180. In addition, these expenses will be tracked as part of the receivable and debtor queries records 182. The information can be extracted from the financial management system into a debtor data warehouse 86 which can provide a comprehensive picture of the management of debt within the organization.

Next, the system calculates 174 other outstanding charges, such as outstanding interest or penalties. The financial management system receivable record and charge frequency dates 172 are accessed and the charges calculated. For example, interest charges may be added to delinquent debt every 30 days. The referral may occur on the $10^{th}$ day of the cycle. A portion of the interest charges need to be calculated and applied to the debt as part of the referral. To support this need, the financial management system provides for the calculation of outstanding interest, penalty, and administrative charges based upon general criteria (such as a percent based upon the type of receivable) and specific criteria (such as the charge to be assigned to the specific receivable record). If the calculated charges are greater than zero (176), these charges are added to the debt as part of the referral and posted 178 in the financial management system as expenses. Again these expenses are conventionally accounted for in the financial management system's general ledger, budget, operating plans, project management, and cost accounting modules.

Once all the fees and charges have been calculated, the system 14 conventionally posts 178 them to the appropriate files 180, 182 and 86.

Figure 7:
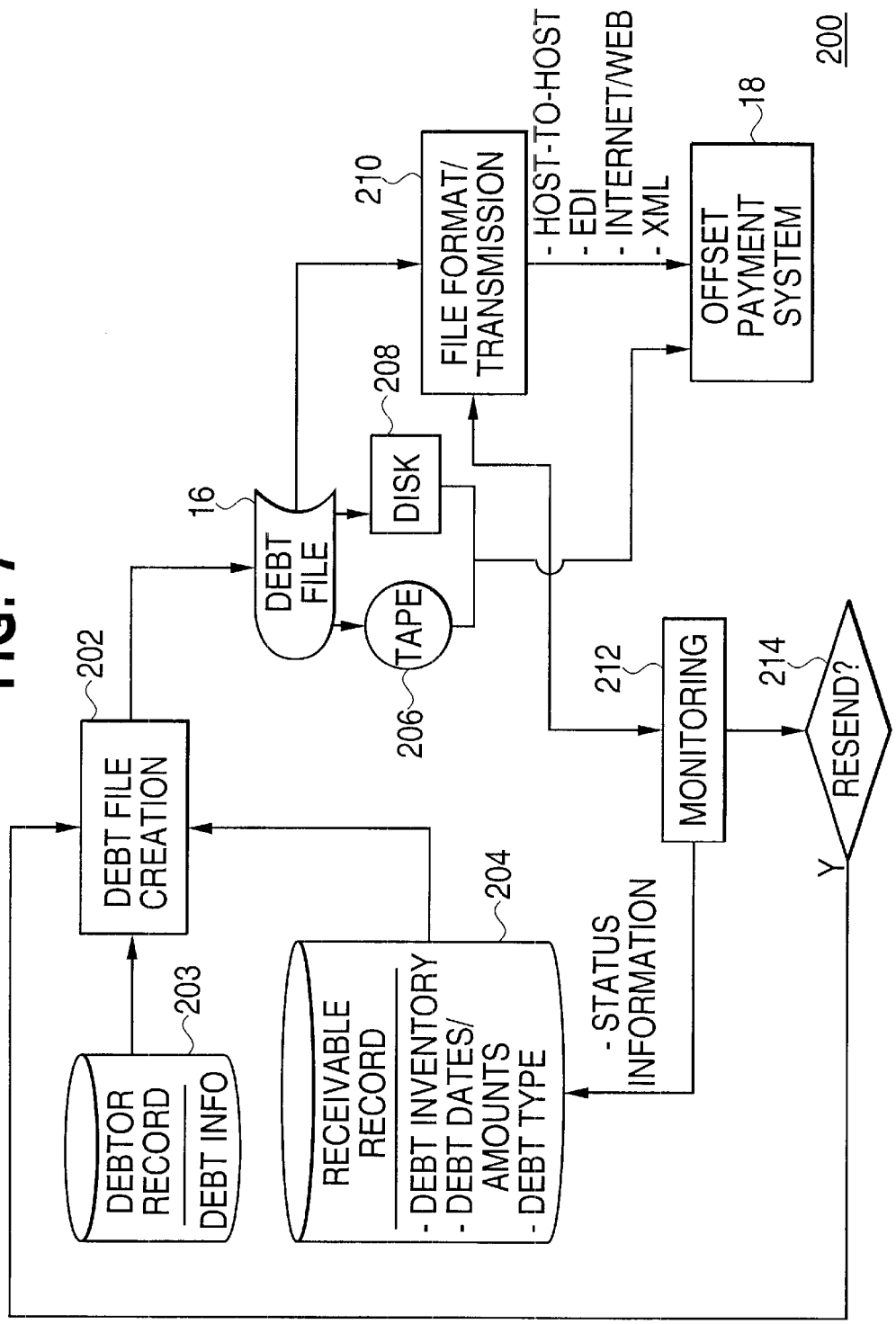
FIG. 7 illustrates generating and transmitting of a debt file.

The referral of debt to a third-party offsetting system 18 (such as TOP) may require the creation of a debt records or a file and the transmission thereof to the offset system 18 as shown by the process 200 in FIG. 7. For example, a company division or a federal agency may create a batch file containing delinquent debt information and transmit the file to the financial management system of the offset entity for inclusion in an offset payment system. To do this, the financial management system 14 creates 202 a file 16 containing the data elements required by the offset system from the debtor record 203 and the receivable record 204, such as:

Debtor identification information—This can be the debtor's tax payer identifying number, name, and address.

Debt identifier—This can be a transaction number that the entity uses to identify the debt.

Debt dates and amounts—This can be the date the delinquency began, the debt origination date, and the current and original debt amounts. It might also include the percentage of offset associated with the debt.

Type of debt—This would typically identify the type of debt.

The debt file may be automatically transmitted from the financial management system 14 to the offset system 18 through a variety of mechanisms. When magnetic tape 206 is used the file is stored on a tape and physically transmitted to the offset system 18. When a disc 208 is used the file is stored on a compact or floppy disk and physically transmitted to the offset system 18. When the file 204 is transmitted Host-to-host the file is formatted 210 for the type of transmission and transmitted from the operating entity's computer to the offsetting system's computer via TCP/IP or other host-to-host communication protocols. When an EDI format is used, file is formatted and transmitted through an Electronic Data Interchange (EDI) network. When the Internet is used for the transmission the file is formatted for and transmitted through an Internet or World Wide Web communication transport mechanism. When an XML format is used, the file is formatted and transmitted using XML file formats.

Once file transmission has started, the financial management system monitors 212 the transmission of the file, tracks the status of the transmission, and provides restart/recovery/resend 214 capabilities in the event that the transmission is unsuccessful.

Figure 8:
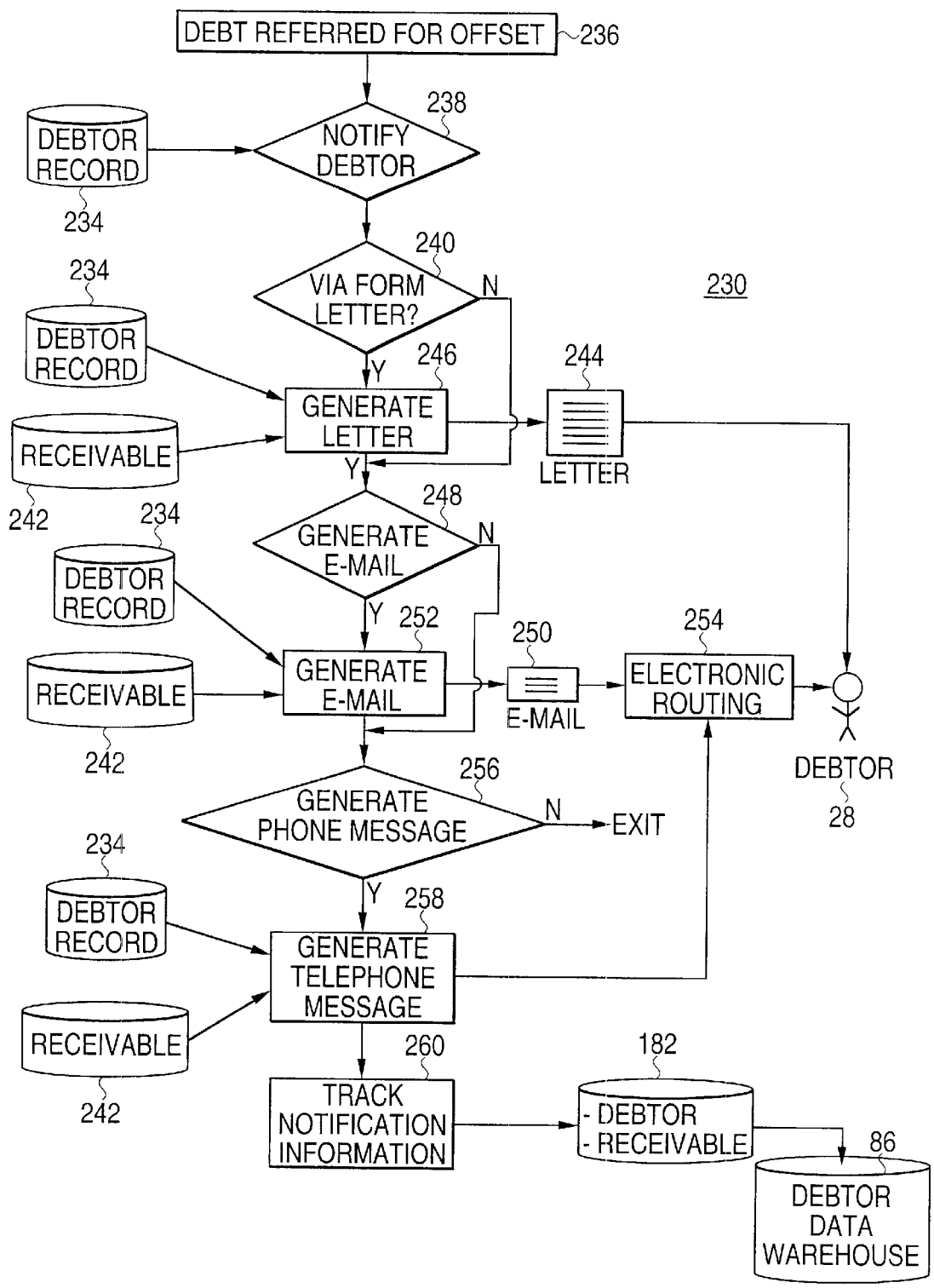
FIG. 8 shows the debtor notification process performed by the system referring the debt for offset.

When the debt 236 has been referred for offset the system 14 can optionally notify the debtor 28 of the referral via a process 230 as shown in FIG. 8. The financial management system debtor record 234 contains information such as the debtor name, contact, address, e-mail address and phone number. The referral can perform either one or multiple of the following types of debtor notifications. A form letter can be generated addressed to the contact at the debtors address. The letter provides information on the debt (including the description, amount and dates). This letter can be sent out directly or routed to a workflow process where it can be customized using conventional word processing procedures. An e-mail can be generated and transmitted automatically from the financial management system 14 through a standard e-mail interface (e.g., through the integrated mail package). The e-mail message provides information on the debt (including the description, amount, and dates). Again, this message can be workflow customized. The financial system 14 is also capable of constructing a phone mail message that can be automatically transmitted telephonically to the debtor at the debtor's phone number. In providing the above discussed features, once the debt 236 is referred, the system examines 238 the debtor record 234 to determine whether the debtor is to be notified. If so, a determination is made 240 as to whether a letter is to be sent. When a letter is to be sent, the receivable and debtor database 242 and 234 is accessed for the description, amount and dates associated with the debt and a form type letter 244 is generated 246 and sent to the debtor 28. When an e-mail message is to be generated 248, again the database 234 and 242 is accessed and the message 250 is generated 252. This message is then electronically routed 254 in a conventional manner. If a telephone message is to be generated 256, again the data is accessed, and the telephone message is produced 258 scheduled for routing 254. Once the message is sent, the system tracks 260 the notification information and updates the debt record in the system database 182 as well as in the data warehouse 86.

Figure 9:
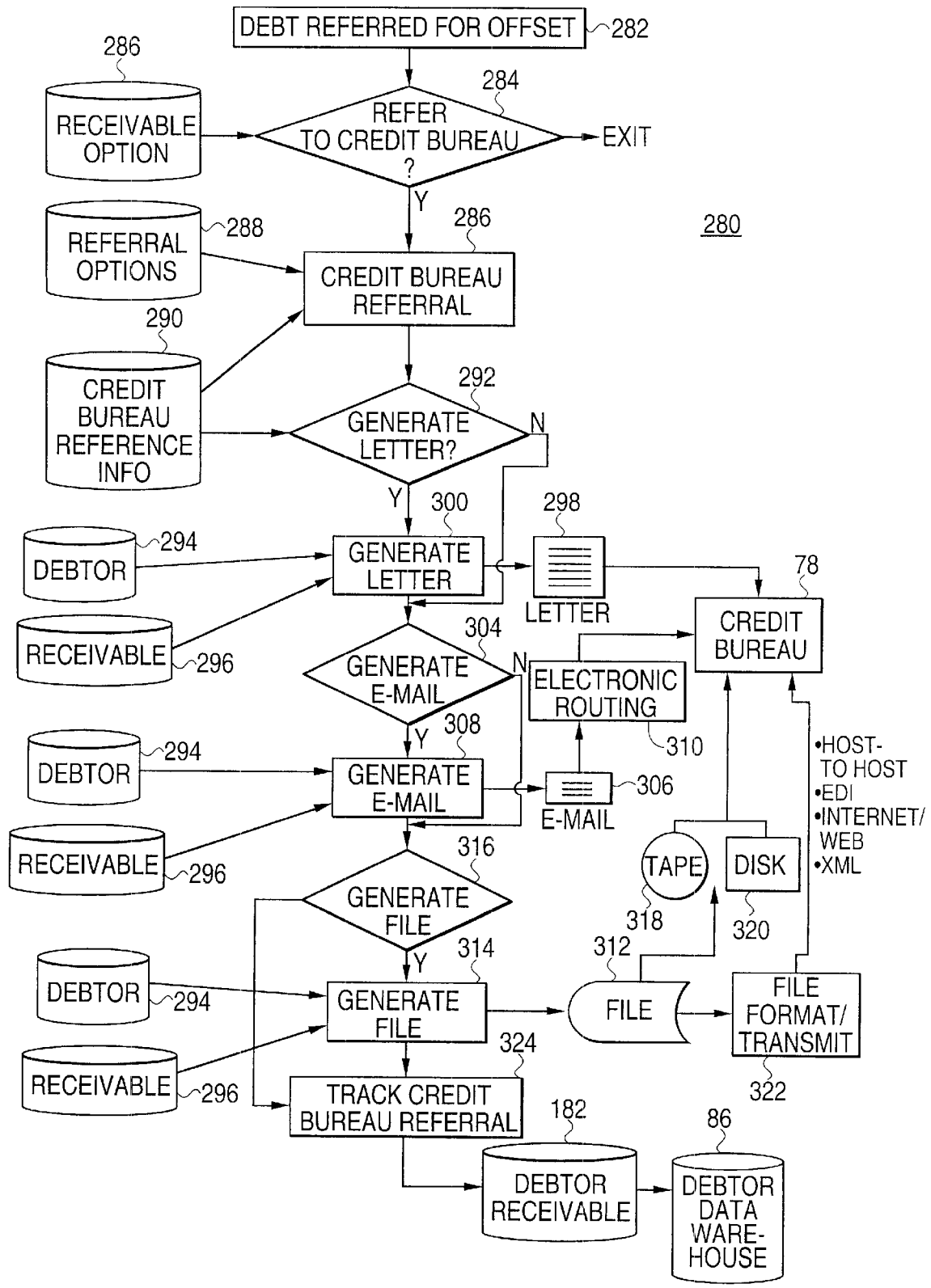
FIG. 9 shows the operations performed in notifying a credit bureau of the referral.
Figure 10:
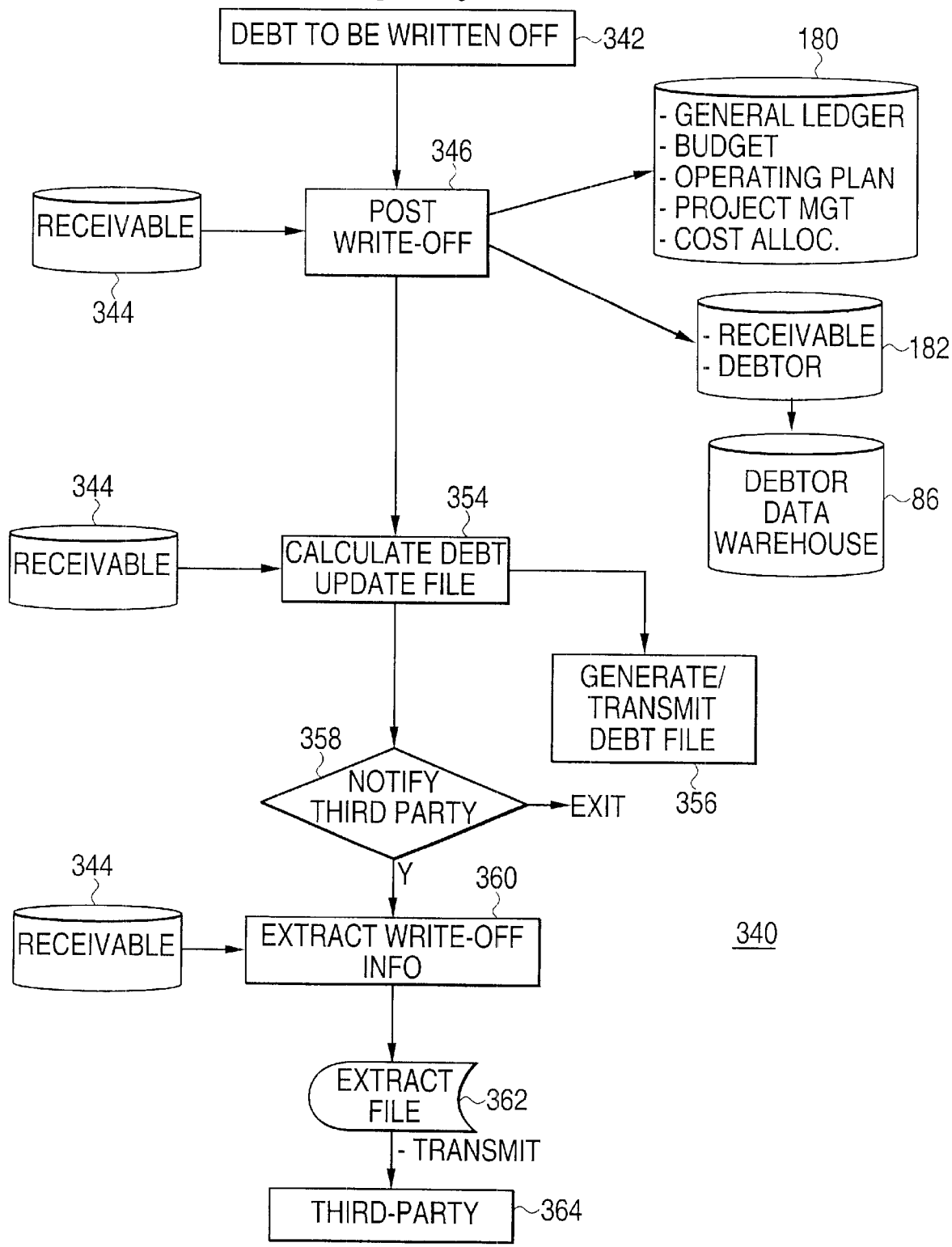
FIG. 10 depicts the write-off process.
Figure 11:
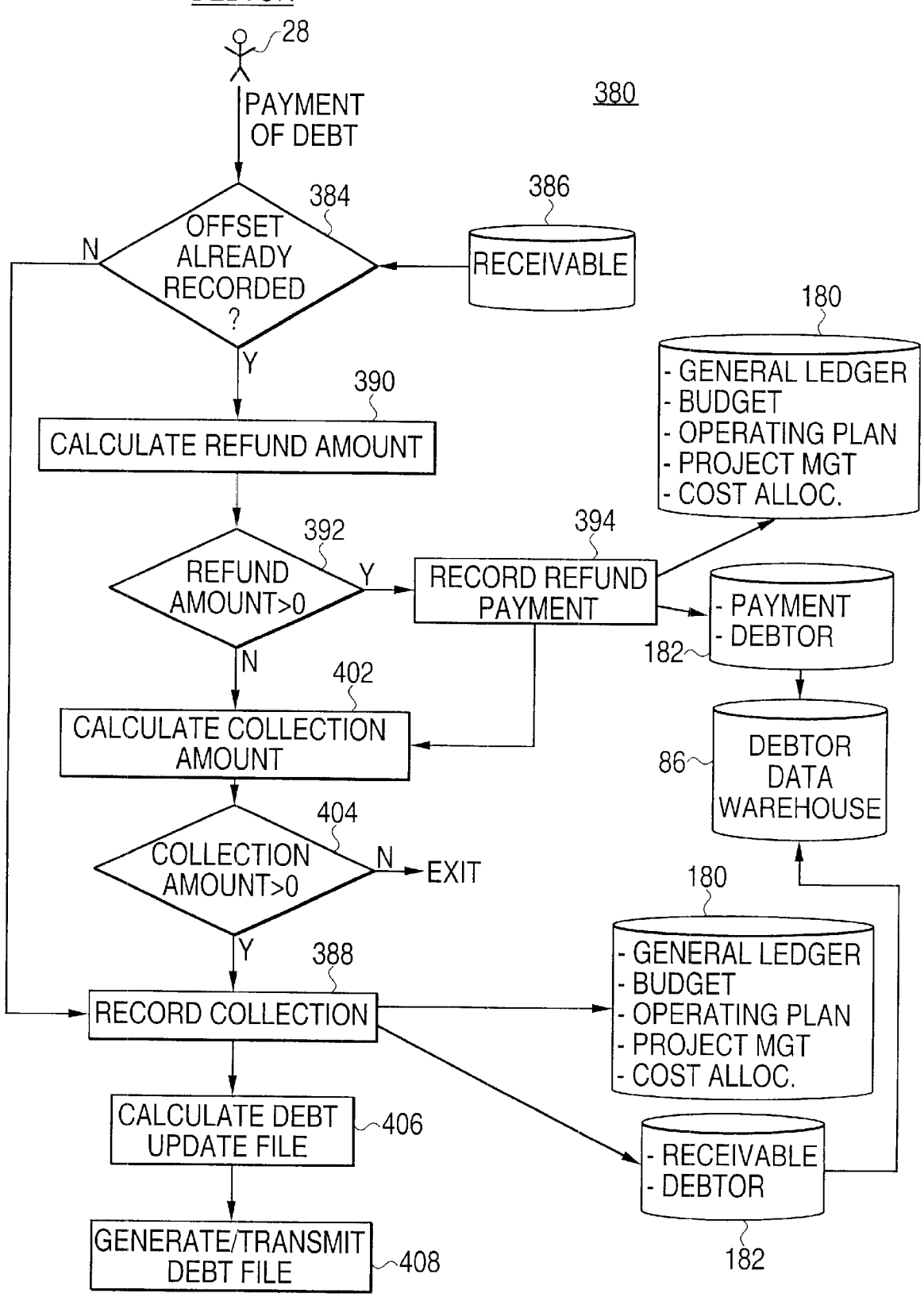
FIG. 11 shows how a debt payment is handled when the debt has been referred.

As noted previously the system of the present invention optionally provides for the automatic referral of the debtor/debt information to credit bureaus when debt is referred for offset as depicted in the process 280 of FIG. 9. To facilitate this, credit bureau reference information such as the name, address, contact, phone, and e-mail address is provided into the financial management system 14. When the debt 282 is referred, the system first checks 284 the receivable database 286 to determine if the debt has been marked for referral to a credit bureau. If so the referral options, identifying the credit bureau to which the debt referral notification would be made, are retrieved 286 from the referral options portion 288 of the database along with the credit bureau information 290 noted above. This information is used to determine 292 whether a letter should be generated and sent to the bureau. If so, the debtor and receivable portions 294 and 296 of the database are accessed and the letter 298 is generated 300 and sent to the credit bureau 78. If so, a form type letter 298 can be generated addressed to the contact at the credit bureau's address. The form letter 298 would provide information on the debt (including the description, amount, and dates). A similar sequence is used to determine whether an e-mail message 306 is to be generated. If so it is generated 308 and routed 310. A form type e-mail message 306 can be generated and transmitted automatically from the financial management system 14 through a standard e-mail interface (e.g., through the integrated mail package). A file 312 like that previously described can also be generated 314 when needed 316. This file could be sent as a tape 318 or disk 320 or formatted 322 and transmitted via a protocol as previously discussed. In all cases, a record of the credit bureau notification is tracked 324 in the financial management system 14 and associated with the debt record 182. The information can also be extracted from the financial management system 14 into a debtor data warehouse 86 which can provide a comprehensive picture of the management of debtors and debt within the organization.

Debts referred for offset may be collected (e.g., by the operating entity) or offset by payments (i.e., through the offsetting system). In addition, debts that are not collected or offset may be written off as bad debts after a period of time. The designation of which debt to write-off is handled in a conventional manner such as designating the debt for write-off when it is older than a predetermined date. The financial management system write-off capabilities of the present invention include writing off debt referred for offset as depicted by the process 340 of FIG. 10. The process of FIG. 10 includes using the debt 342 to access the receivables portion 344 of the system database and update the financial management system components. In doing this, the write-off transactions are posted 346 in the financial management system's general ledger, budget, operating plans, project management, and cost accounting portions of the database 180. In addition, they are tracked as part of the receivable and debtor queries records 182. As in other cases, this information can be extracted from the financial management system into a debtor data warehouse 86 which can provide a comprehensive picture of the management of debtors and debt within the organization.

When the write-off occurs the debt records in the offset system 18 need to be updated. To do this the receivable file 344 is accessed and the update to the debt file is determined 354 and results in the creation 356 of a debt updated file which is transmitted to the offset system 18. This file references the original receivable referred for offset and marks it for write-off (e.g., removal) in the offset system 18. The updated file essentially shows that the debtor owes nothing to the receivable entity 12. The transmission of this file is accomplished as previously described herein.

When a debt is written off, it may be necessary 358 to notify other third parties such as credit bureaus. As another example, in the federal government, the write off of bad debt is reported to the IRS via form 1099C as income to the debtor. The financial management system extracts 360 the write off data, includes it in a file 362, if appropriate, and transmits the information to third parties 364. Debts referred for offset may be collected by the operating entity. For example, following the referral, the debtor 28 may make a payment of some or all of the debt. Due to timing differences or other misinformation, the debtor may pay back debt that has already been reduced through payment offsets. In the present invention, as depicted by the process 380 of FIG. 11, when a payment of debt record is received, the system first checks 384 the receivable file 386 to see if an offset has been recorded against the debt. If it has not, the system will record 388 the payment of debt as a collection. If an offset has been recorded, the system will calculate 390 what portion of the payment of debt should be treated as a collection (i.e., to reduce the outstanding debt) and what portion should be treated as a refund (i.e., to reimburse the debtor after the outstanding debt has been fully reduced). If a refund is due 392, the system records or posts 394 the refund in the relevant portions 180 and 398 of the system files as well as in the data warehouse 86. A payables system will process the refund the same as any other payment resulting in a payment, if appropriate, being sent to the system 18. If there is no refund due, the new debt amount is calculated 402. If this amount is greater than zero, the new collection amount is recorded 388 in the appropriate file portions 180 and 182. Collection transactions are posted in the financial management system's general ledger, budget, operating plans, project management, and cost accounting system files 180. In addition, collections are tracked as part of the receivable and debtor queries. The debtor payment records are updated to reflect the collection of debt for referral queries. This information can be extracted from the financial management system into a debtor data warehouse 86 which can provide a comprehensive picture of the management of debtors and debt within the organization. When a debt is collected, the offset system 18 will need to be updated (e.g., to reduce the amount of debt by the collection amount). The collection of debt referred for offset will result in the calculation 406 and creation of an debt update file. This file references the original receivable referred for offset and update the debt amount by the collection amount. The transmission 408 of this file to the offsetting system is accomplished as previously described herein.

The calculation of collections and refunds when an offset has already been recorded is as follows. If the payment amount is less than or equal to the outstanding debt (=original debt minus all offsets), then the collection amount is the full payment amount. There is no refund amount. For example, if the outstanding debt is $1000 and the payment is $1000 or less, the payment of $1000 is treated entirely as a collection. If the payment amount is greater than the outstanding debt, then the collection amount is the set equal to the amount of the outstanding debt. The refund amount is the payment amount minus the outstanding debt amount. For example, if the outstanding debt is $1000 and the payment is $1800, the collection amount is $1000 and the refund amount is $800.

Figure 12:
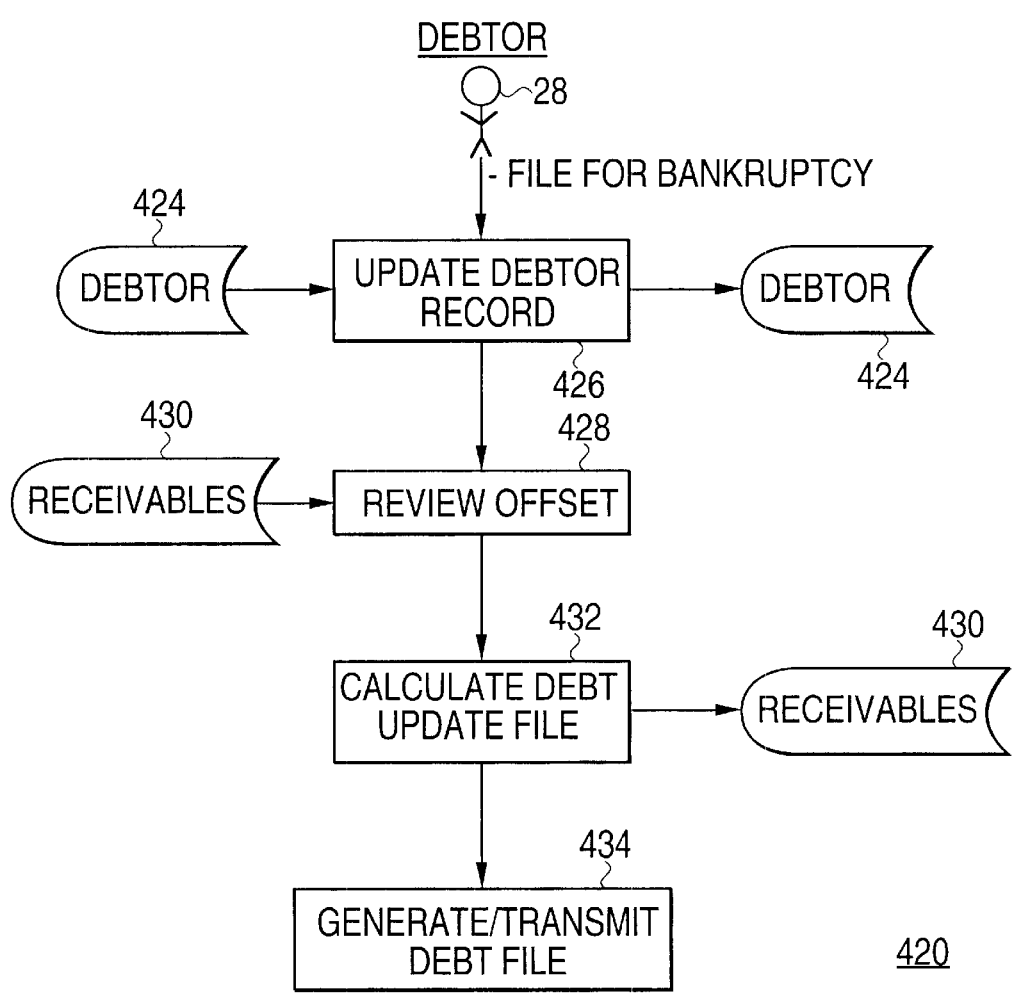
FIG. 12 illustrates the updates performed when a debt or is involved in bankruptcy.

A debtor may file for bankruptcy after a debt has been referred for offset. The operating entity (e.g., the federal government) may need to be a claimant in bankruptcy proceedings. Dependent upon the results of a bankruptcy ruling, it may be necessary to modify the offset eligibility for the debtor (e.g., it may no longer be subject to offset). In this case, any debts referred for offset may need to be removed from the offset system 14. FIG. 12 shows a process 420 for doing this. When bankruptcy information is received for a debtor 28, the debtor records 424 are retrieved and updated 426 according to the particular situation. For example, if the debtor is bankrupt, notices of delinquency may not be sent and the system 14 needs to not send notices. When a debtor record is so marked for bankruptcy, the system reviews 428 the receivables file 430, updates the receivables file and generates 432 debt update file which is transmitted to the offset system 18 in a manner as previously discussed. This file references all of the original receivables to the debtor that were referred for offset and marks them for removal in the offset system 18. In addition, the bankruptcy ruling may be defined such that the rescission of debt results in the nullification of any payment offsets. In this case, the operating entity would need to generate refund payments for any payment offsets that have occurred. To accommodate this, for each payment offset, the financial management system 14 generates a refund transaction. Refund transactions are recorded as payments in the financial management system and processed as previously discussed. These refund transactions are posted in the financial management system's general ledger, budget, operating plans, project management, and cost accounting modules. In addition, they are tracked as part of the payment and debtor queries. The payment queries records are updated to reflect the refund due to the overpayment of debt. This information again can be extracted from the financial management system into a debtor data warehouse which can provide a comprehensive picture of the management of debtors and debt within the organization.

Figure 13:
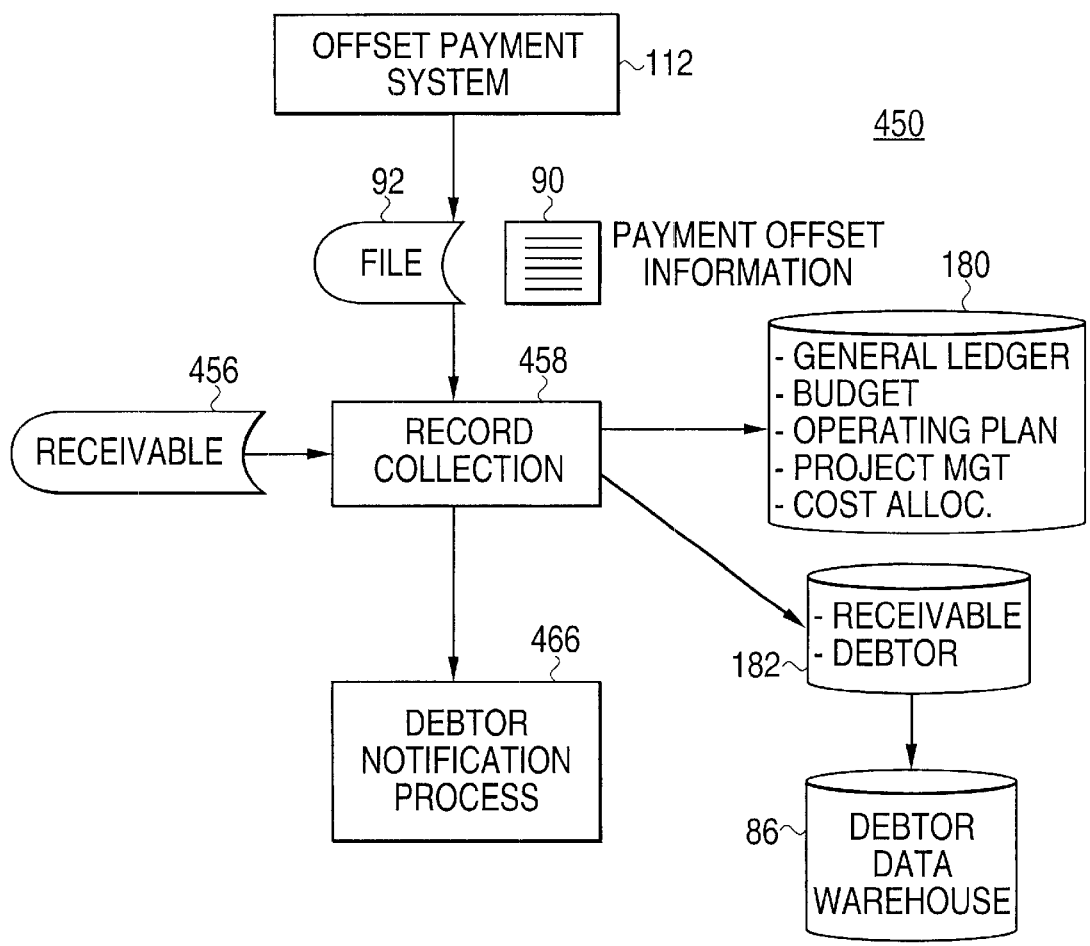
FIG. 13 shows updating the accounts receivable responsive to an offset.

As part of the processing of payments, the offset payment system 18 matches delinquent debtor files against payment files. If a match occurs, the payment is intercepted and the payment is offset up to the amount of the debt. A payment that offsets a debt is treated as a collection in the financial management system 14. FIG. 13 depicts a process 450 that handles these offset collections. The collection transaction may be generated automatically (e.g., if the payment offset information is sent via an electronic file 92) or may be entered into the financial management system manually based on a notification letter 90 from the offset system 18. In performing the update the receivables file 456 is retrieved and the "collection" is recorded or conventionally posted 458 in the financial management system's general ledger, budget, operating plans, project management, and cost accounting system records 180 as well as the debtor records of the receivable file 182. This information can be extracted from the financial management system into a debtor data warehouse 86 which can provide a comprehensive picture of the management of debtors and debt within the organization. When a payment offset is recorded in the financial management system, it may be desirable to notify the debtor (e.g., if the offset system has not already performed the notification and the credit bureaus. This notification 466 can be optionally invoked in the financial management system when the payment offset is recorded. The notification mechanisms are the same as those previously discussed herein.

Figure 14:
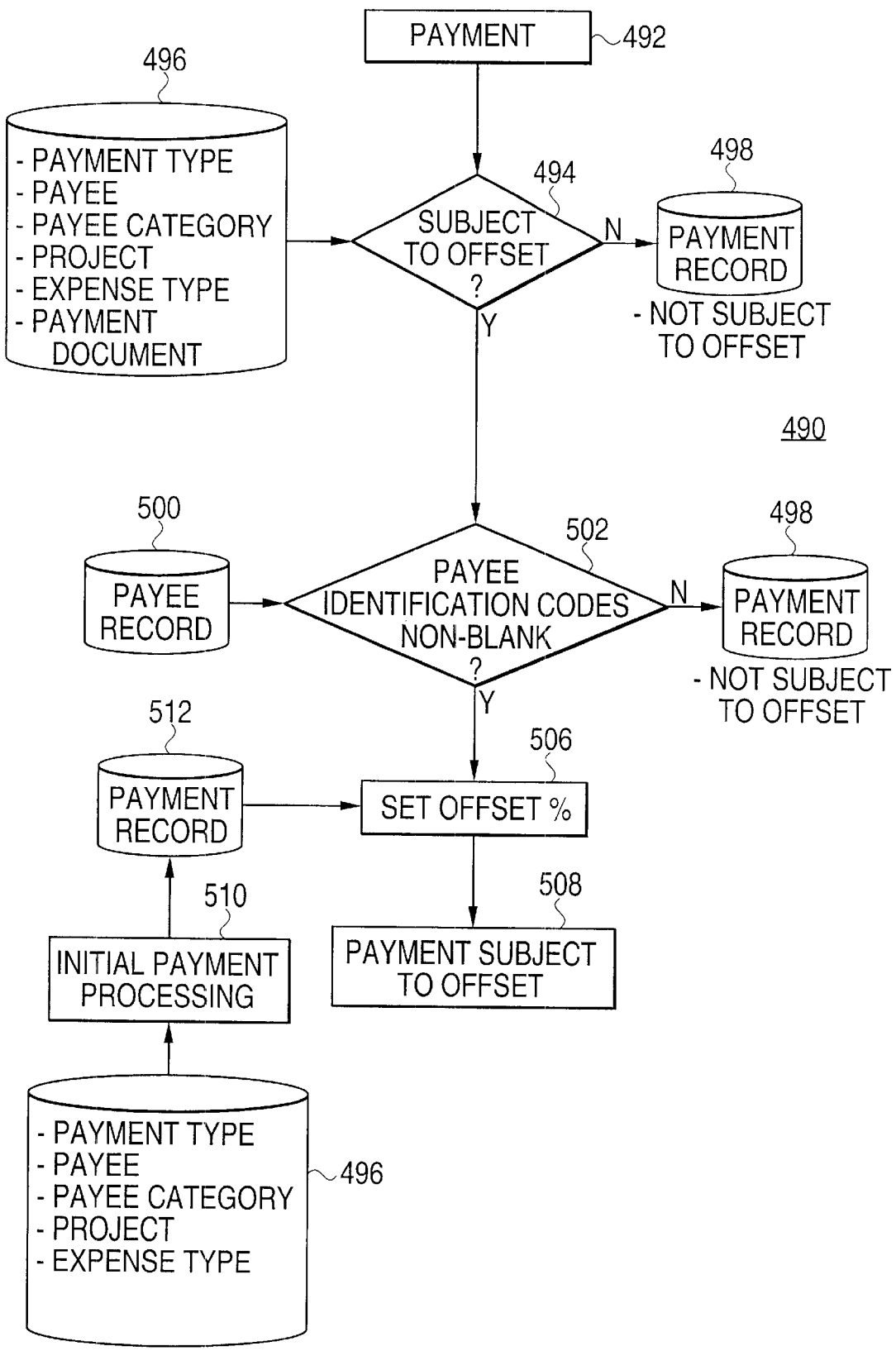
FIG. 14 depicts how payments are selected that can be offset.
Figure 15:
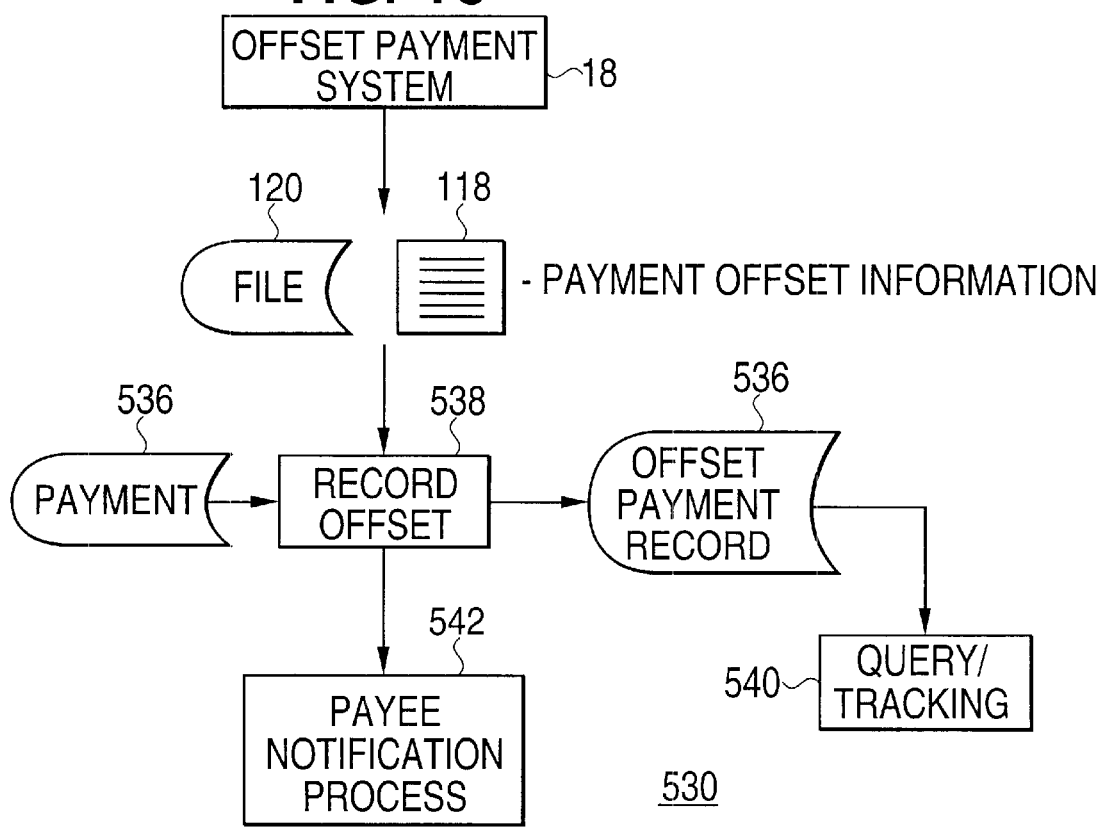
FIG. 15 shows updating accounts payable based on an offset

As part of the accounts payable processes, the financial management system 22 includes the ability to generate payment records or files for disbursement through a third-party (such as Treasury FMS for federal government payments). To support the third-party offset system, the payment process includes a process 490 as shown in FIG. 14 that determines which payments are subject to an offset. For example, payments for a scholarship program may not be subject to an offset even when an educational institution owes the government money for other reasons. When a payment 492 is authorized the system determines 492 if the specific payment is subject to offset by accessing the payment criteria portion 496 of the payables system database. The criteria for offset may vary based upon the specific type of the payment, the specific payee, the payee category, the project associated with the payment, the type of expense associated with the payment, or the specific payment document. An offset indicator is provided in the financial management system payment records 496 that defines the different types of payments, the projects, the payees, the payee categories, the types of expenses, and the payment document. A payment will only be subject to offset if all of the indicators indicate that it is subject to offset. If it is not subject to offset the payment records are so updated 498.

Offset systems will typically use unique payee identifier codes and a payee name to perform the match of payments against delinquent debts. For example, TOP uses the taxpayer identification number (TIN) of the payee in conjunction with the payee name. The system accesses the payee records 500 for the identifier and if the identifier does not exist 502, the payment record 498 is updated to reflect that no offset is to occur.

In making an offset it is possible that only a portion or percentage of the payment can be offset. Various criteria may be used to determine 506 the percentage of offset that should be applied to make the payment 508. For example, certain types of payments may be subject to offset up to 50%. It may vary based upon the specific type of the payment, the specific payee, the payee category, the project associated with the payment, or the type of expense associated with the payment. An offset percent field is provided in the financial management system records that define the different types of payment, the payees, the payee categories, the projects, and the types of expenses. When a payment is initially processed 510 to produce the payment record 512, the percentage is determined based upon the percent associated with the type of payment, payee category, payee, project, or type of expense of the system database.

As part of the processing of payments, the offset payment system 18 matches delinquent debtor files against payment files. If a match occurs, the payment is intercepted and the payment is offset up to the amount of the debt. A payment that is offset is recorded as disbursed for the full original payment amount in the paying financial management system 22. The disbursement transaction for an offset payment is accounted for no differently than any other payment in the financial management system. Although the disbursement accounting remains intact, it is important for the offset payment information to be captured in the financial management system (e.g., in case of payment queries). This is accomplished by the process 530 depicted in FIG. 15. An offset payment notification, including the payee and amount is received from the offset system 18 in the form of a file 120 or a letter 118. Within the payment records 536, an offset payment table is provided to record the offset payment information associated with the specific payments. This table is updated 538 to record the offset payment in the record 536. By identifying offset payment information with specific payment records, the financial management system can provide full query, tracking, and analysis capabilities 540 associated with the payment or payee as described herein. When a payment offset is recorded in the financial management system, it may be desirable to notify the payee (e.g., if the offsetting system has not already notified him/her). This notification 542 can be optionally invoked in the financial management system when the payment offset is recorded. The notification operations are the same as those previously discussed herein.

In the offset system 18, debts may be offset by payments to the debtor. The offset may partially or fully reduce the debt. Following the payment offset, the offset system 18 will notify the entities 12/14 and 20/22 originating the debts and payments with information such as:

Debtor identification information which includes the debtor's unique identifier (e.g., TIN) and debtor contact information (name, address, etc.).

Debt identification information including the unique identifier for the debt entity and debt record.

Payment identification information—this would include the paying entities and payment data (such as a check or EFT trace numbers).

Amounts—this would include the payment amount (which may be zero if a payment was fully offset), the offset amount, and the remaining debt amount.

Payment Offset Date—this would be the date of the payment offset.

Debtor/Payee Notification Indication—this would indicate whether the offsetting system (or third-party operating the offsetting system) has notified the debtor/payee of the offset and how it has done so (i.e., the method of notification).

Figure 16:
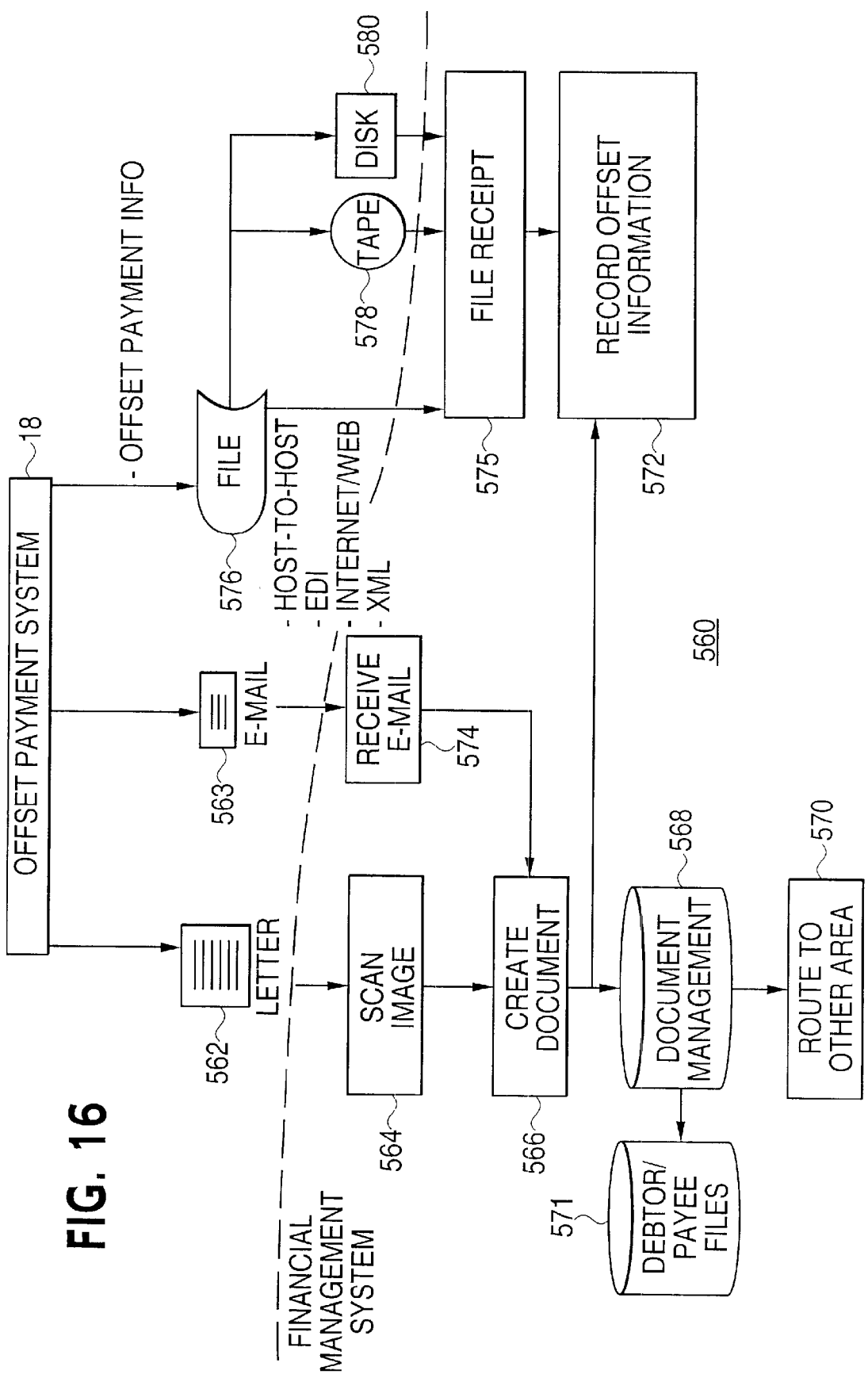
FIG. 16 depicts the receipt of offset payment information via multiple media.

The offset system 18 may transmit the information to the operating entity via a letter, e-mail, or an electronic file and the financial management system performs a process 560 as shown in FIG. 16. To receive a letter 562, the financial management system 14/22 scans 564 and creates 564 a document 566 in the system thereby treating the image as a document in the financial management system. The image can be routed through the system's workflow engine or document management system 568 gaining access to debtor and payee files 571 and using the system's conventional data exchange mechanisms to various business areas 570 such as receivables, procurement, or payables departments. The scanned image document can also become part of the debtor/payee's files 572 stored within the system. If the notification is an e-mail 563, the received e-mail message 574 is also treated as a document in the financial management system with the same results. The invention also allows the receipt of an offset payment file 576 using various media including: tape, disk, host-to-host, EDI, Internet/Web, XML, etc. which is conventionally converted into a file in the system format. The received information is used to update the system as previously discussed.

Offset payment systems typically provides a mechanism for online access (e.g., the TOP system includes client software that provides access to the TOP data and reports). The financial management system according to the present invention also includes direct, online access as shown in the process 590 shown in FIG. 17. When a request arrives from the offset referral process 592, the system determines 594 whether it is requesting an online transmission or an offline transmission. If offline, the process of FIG. 7 is executed 593. If the request is for an online transmission the system accesses the receivables portion 596 of the system files and generates 598 the debt data. The debt data is generated as previously discussed herein and the file is transmitted through the direct access connection to the offset system 18.

The financial management system (payable 22 and receivable 14 systems) and the offset payment system 18 contain debt records and offset payment data. Given that these are independent systems, the data in the systems needs be reconciled to ensure that they are synchronized. A reconciliation process is provided by the present invention through the direct online connection to the offset system 18.

The reconciliation can be partial (i.e., the reconciliation of a user-defined set of data) or full (i.e., the complete reconciliation of all data in the systems). The reconciliation is invoked 602 and the system determines 604 whether it is an online (e.g., through a user prompt) or offline (e.g., through the execution of an offline job) reconciliation. If it is offline the system sets 606 the process for offline execution. If online a determination 608 is made as to whether the reconciliation will run as a "while you wait" query 610 with the appropriate priorities set 610 or as a daemon process running in the background where priorities are set 612 differently. With the appropriate priorities set the system retrieves the reconciliation criteria 614, such as the range of records to be reconciled, and performs the reconciliation 616. In performing the reconciliation, the financial management system receivable or payment records 613 referred for offset are accessed. Each receivable or payment record is compared to the corresponding record in the offset payment system 18. The reconciliation output 618 is available in numerous formats including online query 620, hard copy report 622, or in electronic file format 624. The system also determines 626 whether a discrepancy exists and if so whether 628 synchronization is to be performed. For example, a debt referral record in the financial management system might have an amount of $2000. The same record in the offset system might have an amount of $20000. Invoking the synchronization based on the financial management system option in this case will result in the creation of a debt update file 630 correction transaction for $2000 synchronizing the offset system 18 with the financial management system 14. Invoking the synchronization based on offset system option in this case will result in the creation of a receivable modification transaction 630 netting to $20000 in the financial management system receivables file 634 synchronizing the financial management system 14 with the offset system 18. In addition, a financial management system query 635 provides, through the use of conventional database query processes, a front-end to the offset payment system for user queries.

When a debt record is referred for offset, the financial management system of the present invention updates the receivable and debtor records with offset referral information (i.e., the amount and date of the referral). When a payment offset is recorded, the financial management system of the invention updates the receivable, payment, and payee/debtor records with offset payment information (i.e., the payment/debt identifiers and the amount and date of payment offset). Through these updates, the offset information can be made available for the following types of queries and tracking and analysis mechanisms as depicted in the process 650 of FIG. 18. The system, based on an online query, can produce 652 query responses related to the receivable, payment, and payee/debtor data as well as offline reports 656. Any online financial management system queries and offline reports related to the receivable, payment, or payee/debtor would contain the offset information discussed herein. The system also provides external payee/debtor query capabilities through an external World Wide Web payee/debtor query 658 or through a telephonic payee/debtor query 660. Upon successful conventional secured identification, the payee/debtor's receivable or payment information is conventionally displayed or communicated through these queries. For a debtor or receivable query, the information will include the billing and collection history, outstanding receivables, referral information, and offsets. For a payee or payment query, the information will include the payment history, outstanding payments, and offset payments.

As the system of the invention processes 662 debt for referral, a count of the number of times the debtor has had debt referred for offset along with total amount of the debt referred is stored in the debtor record 664. The system compares 666 this information to a referral notification threshold to determine the point when a notification message should be issued (i.e., when the count and/or amount reach the thresholds). Using this information, the financial management system issues 668 a notification when a subsequent financial transaction is processed (such as an order, invoice, or payment transaction) for the debtor/payee and the referral count or amount meets the system threshold. In addition, when the threshold is met, the financial management system extracts 670 debtor/payee information 672 and provides it to other external systems 674 (such as procurement) in order to provide for flagging of the debtor/payee in other systems within the organization.

As previously mentioned, the system of the invention includes a debtor data warehouse 86 which provides a comprehensive picture of the management of debtors and debt within the organization. Debtor trend analysis 678 for reports and queries can be performed using this data and produce organization statistics 680 on the delinquency and collection activity for specific debtors and categories of debtors. This data is also utilized in the organization's risk management operations 682.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A process interacting with an offset payment system, said process comprising:

determining, within a computer implemented accounts receivable financial management system separate from the offset payment system, debt to be referred for offset payment responsive to debt selection criteria comprising debt age, debt amount and number of delinquent notices;

adding, within the computer implemented financial management system, to the debt administrative charges, interest and penalties;

limiting, within the computer implemented financial management system, the debt offset by an offset percentage;

referring the debt to the offset payment system responsive to the determination;

determining, within a computer implemented accounts payable financial management system separate from the accounts receivable system, a payment to be referred for offset of a debt responsive to payment selection criteria comprising payment type, payee and expense type;

referring the payment to the offset payment system responsive to the determination;

updating automatically, within the computer implemented accounts receivable financial management system, debt records responsive to an offset by the offset payment system the debt records comprising general ledger records, budget records and planning records;

updating automatically, within the computer implemented accounts payable financial management system, payment records responsive to the offset by the offset payment system;

accepting a payment from a debtor;

updating automatically, within the computer implemented accounts receivable and accounts payable financial management systems, the payment and the debt records and updating the offset records in the offset payment system responsive to the payment;

accepting a write-off authorization for a debt;

updating automatically, within the computer implemented accounts receivable and accounts payable financial management systems, the payment and the debt records and updating the offset records in the offset payment system responsive to the write-off;

reconciling, within the computer implemented accounts receivable and accounts payable financial management systems, payments, debts and offsets;

accepting a bankruptcy notification for a debt;

updating automatically, within the computer implemented accounts receivable and accounts payable financial management systems, the payment and the debt records and updating the offset records in the offset payment system responsive to the notification;

notifying a debtor of the referral and the offset;

notifying a third party of the referral;

creating, within the computer implemented accounts receivable and accounts payable financial management systems, document images for referrals and notifications for using images in work flow operations; and providing online access to offset payment records.

2. A process interacting with an offset payment system, said process comprising:

determining, within a computer implemented accounts receivable financial management system separate from the offset payment system, debt to be referred for offset payment responsive to debt selection criteria comprising at least one of debt age, debt amount and number of delinquent notices;

adding, within the computer implemented financial management system, to the debt administrative charges, interest and penalties;

referring the debt to the offset payment system responsive to the determination;

determining, within a computer implemented accounts payable financial management system separate from the accounts receivable system, a payment to be referred for offset of a debt responsive to payment selection criteria comprising at least one of payment type, payee and expense type;

referring the payment to the offset payment system responsive to the determination;

updating automatically, within the computer implemented accounts receivable financial management system, debt records responsive to an offset by the offset payment system the debt records comprising at least one of general ledger records, budget and plan records;

updating automatically, within the computer implemented accounts payable financial management system, payment records responsive to the offset by the offset payment system;

accepting a payment from a debtor;

updating automatically, within the computer implemented accounts receivable and accounts payable financial management systems, the payment and the debt records and updating the offset records in the offset payment system responsive to the payment;

accepting a write-off authorization for a debt;

updating automatically, within the computer implemented accounts receivable and accounts payable financial management systems, the payment and the debt records and updating the offset records in the offset payment system responsive to the write-off;

notifying a debtor of the referral and the offset; and providing online access to offset payment records.

* * * * *